US011807355B2

(12) United States Patent
Kismarton et al.

(10) Patent No.: US 11,807,355 B2
(45) Date of Patent: Nov. 7, 2023

(54) LANDING GEAR SYSTEM WITH COMPOSITE FLEX BEAM

(71) Applicant: The Boeing Company, Chicago, IL (US)

(72) Inventors: Max Urban Kismarton, Seattle, WA (US); Kim Linton, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 1088 days.

(21) Appl. No.: 16/456,760

(22) Filed: Jun. 28, 2019

(65) Prior Publication Data

US 2020/0407048 A1    Dec. 31, 2020

(51) Int. Cl.
*B64C 25/62*    (2006.01)

(52) U.S. Cl.
CPC .................................. *B64C 25/62* (2013.01)

(58) Field of Classification Search
CPC ......... B64C 25/06; B64C 25/62; B64C 25/58; B32B 5/073; B32B 5/12
See application file for complete search history.

(56) References Cited

U.S. PATENT DOCUMENTS

| 5,224,669 A | 7/1993 | Guimbal |
| 6,244,538 B1 | 6/2001 | Howard et al. |
| 2006/0032982 A1* | 2/2006 | Stephens .................... B64C 3/18 244/131 |
| 2013/0153456 A1* | 6/2013 | Zhu ........................... F01D 5/28 206/521 |

FOREIGN PATENT DOCUMENTS

| EP | 143690 A2 * | 6/1985 | |
| EP | 0143690 A2 | 6/1985 | |
| EP | 512897 A1 * | 11/1992 | ............. B64C 25/52 |
| EP | 0512897 A1 | 11/1992 | |
| EP | 0512898 A1 | 11/1992 | |
| WO | 2007106070 A2 | 9/2007 | |
| WO | WO-2007106070 A2 * | 9/2007 | ............. B64C 25/06 |

OTHER PUBLICATIONS

Extended European Search Report dated Sep. 21, 2020 regarding European Appl. No. 20168018.8; 8 pgs.
Siu, "Attach Tabs & Installation," Bernard Siu's Cozy Page, Simpex. Com, 2019, www.cozy.simpex.com/. Accessed Jun. 28, 2019.
Baker, A. et al., "Composite Materials for Aircraft Structures", American Institute of Aeronautics and Astronautics, Inc., Second Edition, pp. 459-460, 2004.
Canadian Intellectual Property Office, Office Action, dated Jun. 16, 2023, regarding Application No. CA3076767, 5 pages.

* cited by examiner

*Primary Examiner* — Nicholas McFall
*Assistant Examiner* — Eric Acosta
(74) *Attorney, Agent, or Firm* — Yee & Associates, P.C.

(57) ABSTRACT

A landing gear system for an aircraft is presented. The landing gear system comprises a composite flex beam having through-thickness stitching and a curvature having a radius greater than 5 inches; and a trunnion connected to the composite flex beam and offset from a neutral surface of the composite flex beam.

20 Claims, 13 Drawing Sheets

LANDING GEAR SYSTEM WITH COMPOSITE FLEX BEAM

BACKGROUND INFORMATION

1. Field

The present disclosure relates generally to landing gear for airplanes and, more specifically, to landing gear for small aircraft.

2. Background

The landing gear for aircraft absorbs the energy of the landing, amongst many other functions. Current designs for large aircraft may include oleo struts, a type of pneumatic air-oil hydraulic shock absorber. However, oleo struts may be undesirably expensive for smaller aircraft. Oleo struts may also add a relatively undesirable amount of weight to some aircraft.

Some aircraft may utilize metal flex beams to absorb the energy of the landing. However, metal flex beams may add an undesirable amount of weight to small aircraft.

Therefore, it would be desirable to have a method and apparatus that take into account at least some of the issues discussed above, as well as other possible issues.

SUMMARY

An illustrative embodiment of the present disclosure provides a landing gear system for an aircraft. The landing gear system comprises a composite flex beam having through-thickness stitching and a curvature having a radius greater than 5 inches and a trunnion connected to the composite flex beam and offset from a neutral surface of the composite flex beam.

Another illustrative embodiment of the present disclosure provides a landing gear system for an aircraft. The landing gear system comprises a composite flex beam having through-thickness stitching and a curvature along an entirety of a length of the composite flex beam, a density of the stitching being greater near a leading edge and a trailing edge of the composite flex beam.

Yet another illustrative embodiment of the present disclosure provides a method of forming a landing gear system for an aircraft. A fiber layers is laid up into a curvature, each fiber layer having a respective fiber orientation. The fiber layers are stitched through along a length of the curvature to form a reinforced plurality of layers, a density of the stitching being greater near a leading edge and a trailing edge of the curvature. A resin is infused into the reinforced plurality of layers to form a resin infused curved structure. The resin infused curved structure is cured to form a composite flex beam of the landing gear system.

A further illustrative embodiment of the present disclosure provides a method of operating an aircraft having a landing gear system with a composite flex beam. The aircraft is flown. A dynamic load from landing the aircraft is absorbed in the composite flex beam by flattening the composite flex beam, the composite flex beam having through-thickness stitching and a curvature having a radius greater than 5 inches in a relaxed state.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
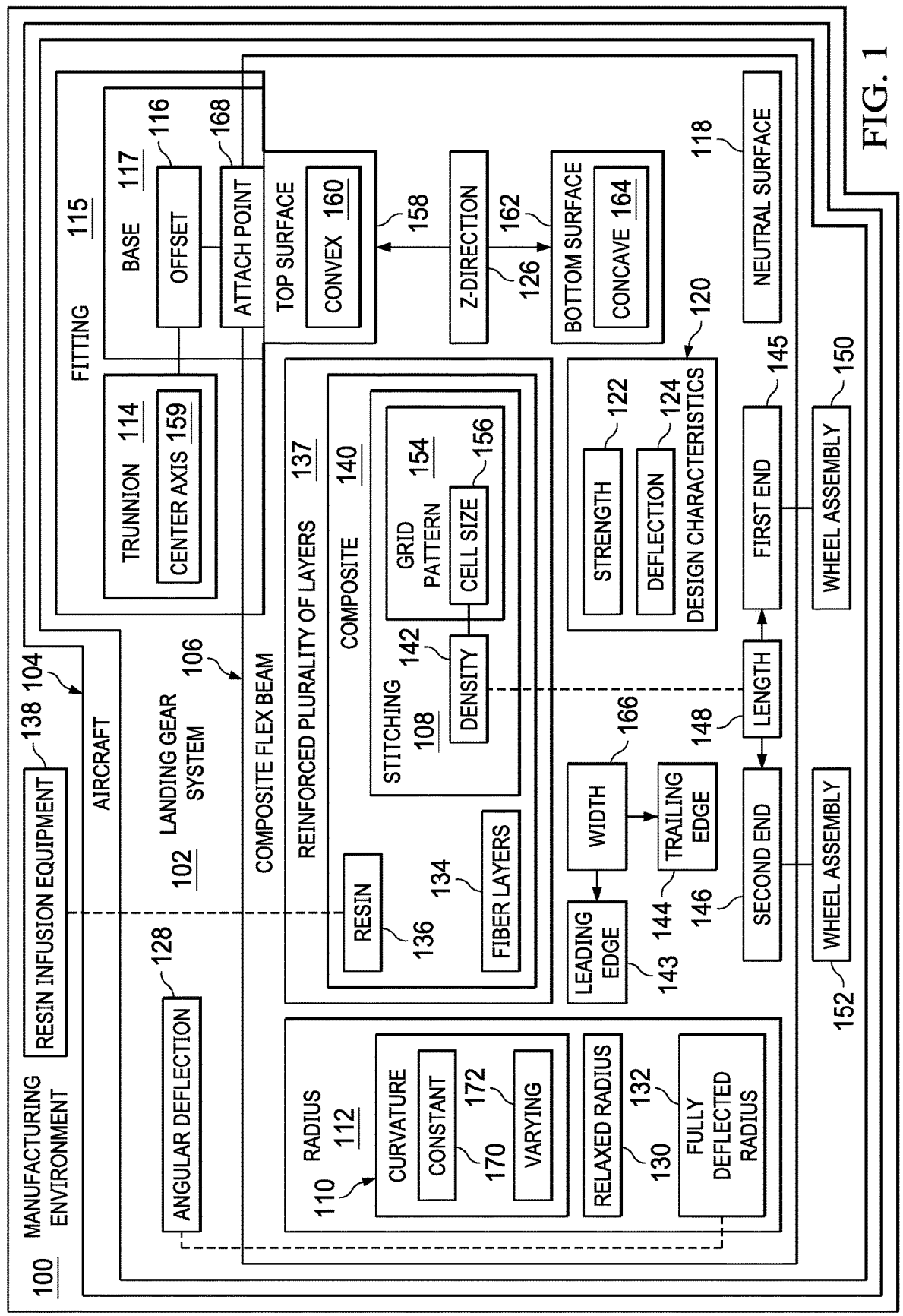
FIG. 1 is an illustration of a block diagram of a manufacturing environment in which a composite flex beam is manufactured in accordance with an illustrative embodiment.

The illustrative embodiments recognize and take into account one or more different considerations. The illustrative embodiments recognize and take into account that it is desirable to reduce cost and weight of an aircraft.

The illustrative embodiments recognize and take into account that composite materials are tough, light-weight materials created by combining two or more functional components. For example, a composite material may include reinforcing fibers bound in polymer resin matrix. The fibers may be unidirectional or may take the form of a woven cloth or fabric. The fibers and resins are arranged and cured to form a composite material.

The illustrative embodiments recognize and take into account that in manufacturing composite structures, layers of fibers are typically laid up on a tool. The layers may be comprised of fibers in sheets. These layers may take the form of fabrics, tape, tows, or other suitable forms. In some cases, resin may be infused or pre-impregnated into the layers.

The layers are stacked and formed in any desirable order. The resin in the sheets is then cured using an oven or autoclave.

The illustrative embodiments recognize and take into account that composite structures are very strong in-plane, and, in particular, strong when placed in tension. The fibers, such as carbon fibers, carry most of the load in-plane. Composite structures, due to their layered nature, are weaker out-of-plane. The resin carries most of the load between the layers.

The illustrative embodiments recognize and take into account that composite materials are lighter than metals, but have higher out-of-plane tension than metals. The illustrative embodiments recognize and take into account that composite structures are prone to Inter-Laminar Tension (ILT). Inter-Laminar Tension in a composite structure is influenced by design of the composite structure. The Inter-Laminar Tension (ILT) stresses increase with any of: a larger opening moment, a tighter radius, or a thinner laminate.

The illustrative embodiments recognize and take into account that any composite structure with a bent flange will experience Inter-Laminar Tension if the bent flange is forced to open. The illustrative embodiments recognize and take into account that as an angle of the bent flange increases due to external forces, radial forces (F-r) emerge. Undesirable amounts of radial forces may cause inconsistencies, such as delamination, in the composite material.

The illustrative embodiments recognize and take into account that the radial forces occur equally in metals or composites. The illustrative embodiments recognize and take into account that the out-of-plane (Z-direction) weakness in composite materials makes this an important consideration in designing composite structures.

The illustrative embodiments recognize and take into account that resistance to bending in a composite laminate is due, at least in part, to interlaminar shear forces. In a composite laminate, the resin between the plies holds the plies in the desired radius without the plies slipping relative to each other. The layers of a composite laminate tend to delaminate due to loading that flattens a curve of the composite laminate.

The illustrative embodiments recognize and take into account that the radial forces on can be estimated using classical curved beam theory or Composite FEA. The illustrative embodiments recognize and take into account that the radial forces can be estimated by $$fILT = \frac{3M}{2R_{avg}t}$$

where fILT is interlaminar tensile stress, M is moment (in this case moment arm length), R is radius, and t is thickness of the cross section.

The illustrative embodiments recognize and take into account that by changing the design of the composite structure, the interlaminar tensile stress is changed. The illustrative embodiments recognize and take into account that by increasing the radius of the composite structure, the interlaminar tensile stress is reduced. More specifically, the interlaminar tensile stress is reduced as the size of the R (radius) increases relative to the M (Moment arm length).

The illustrative embodiments recognize and take into account that stitching in composite structures improves out-of-plane strength of the composite material. Stitching in composite structures improves the strength of the composite in the out-of-plane (normal/perpendicular) direction over the strength of the resin bonding the layers in the laminate. Stitching in composite structures provides fibers in a direction perpendicular to the plane of the laminate, linking at least adjacent laminate plies with fibers/stitches. The stitches in a composite structure increase the three-dimensional nature of the laminate. The stitches in a composite structure provide a load path between the plies beyond the matrix of the resin.

The illustrative examples present a landing gear system with a composite flex beam. The composite flex beam is formed of fiber layers that are stitched and resin infused. The stitching increases interlaminar strength. In some illustrative examples, the stitching suppresses inconsistencies in the composite flex beam due to interlaminar tensile stress. In some illustrative examples, the stitching reduces at least one of the size or the occurrence of out-of-tolerance inconsistencies.

The illustrative examples provide a landing gear system for an aircraft. The landing gear system comprises a composite flex beam having through-thickness stitching and a curvature having a radius greater than 5 inches and a trunnion offset from a neutral surface of the composite flex beam.

Turning now to FIG. 1, an illustration of a block diagram of a manufacturing environment in which a composite flex beam is manufactured is depicted in accordance with an illustrative embodiment. Manufacturing environment 100 is an environment in which landing gear system 102 for aircraft 104 is manufactured. Landing gear system 102 for aircraft 104 comprises composite flex beam 106 having through-thickness stitching 108, curvature 110 having radius 112 greater than 5 inches, and trunnion 114 offset 116 from neutral surface 118 of composite flex beam 106.

Fitting 115 including trunnion 114 connects composite flex beam 106 of landing gear system 102 to an airframe (not depicted) of aircraft 104. Base 117 of fitting 115 connects trunnion 114 to composite flex beam 106. Base 117 takes any desirable size or shape to connect trunnion 114 to composite flex beam 106.

Aircraft 104 is a light aircraft. In some illustrative examples, aircraft 104 is an airplane having between 5 kip and 19 kip takeoff weight. Aircraft 104 has fixed landing gear, and likely a maximum of two engines.

Prior to designing composite flex beam 106, body of aircraft 104 is designed. Aircraft 104 is designed including size and weight considerations. After designing aircraft 104, a desired deflection for landing gear system 102 is selected. Composite flex beam 106 is designed to accommodate the desired deflection.

After setting a desired deflection for landing gear system 102, a tip over point analysis is performed. The tip over point analysis determines the center of gravity of aircraft 104. A spacing of wheel assembly 150 and wheel assembly 152 in landing gear system 102 is determined. Spacing of wheel assembly 150 and wheel assembly 152 is influenced by the tip over point analysis. Spacing of wheel assembly 150 and wheel assembly 152 affects length 148 of composite flex beam 106. Width 166, length 148, and cross-sectional thickness of composite flex beam 106 are designed to meet design characteristics 120 that meet desired standards for landing gear system 102 of aircraft 104. When design of aircraft 104 changes, design of landing gear system 102 may also change.

When designing landing gear system 102, margin check calculations are performed. One margin check includes landing gear assembly 102 location. Landing gear assembly 102 margin check calculations include tip over point and spacing of wheel assembly 150 and wheel assembly 152. This margin check is done by drawing a gear triangle between the each of the nose wheel (not depicted) and wheels of main landing gear, landing gear system 102, including wheel assembly 150 and wheel assembly 152.

Another margin check includes a height of the center of gravity (CG) of aircraft 104. The center of gravity (CG) of aircraft 104 should be within the gear triangle.

A "Cant" angle is measured on a vertical plane that is perpendicular to the gear triangle long side, passes through center of gravity (CG) of aircraft 104. Another margin check includes a belly height of aircraft 104 above the ground. Another margin check includes sill height of aircraft 104 (distance between cargo floor and ground/runway) is checked. In performing a margin check of aircraft 104, the sill height of aircraft 104 is checked using wheel axis height of each of wheel assembly 150 and wheel assembly 152 and locations of fittings and trunnions including trunnion 114 of fitting 115. In the margin check—truck sill height must match cargo airplane sill height +/−2 inches.

Other margin checks include wheel diameter and wheel axis height of wheel assembly 150 and wheel assembly 152, and location of fittings/trunnions, including fitting 115 and trunnion 114. The location of fittings and trunnions include lateral distance between right and left trunnions, (DY, trun). The location of fittings and trunnions also include vertical distance between center axis 159 of trunnion 114 and neutral surface 118 of composite flex beam 106 (DZ, axis).

After design margin checks are performed, deformation margin checks are performed on landing gear system 102. Deformation margin checks include location of belly of aircraft 104 on landing after deflection 124, whether G-levels are in an acceptable range, and whether stresses and strains on composite flex beam 106 are within acceptable ranges.

Composite flex beam 106 is designed to meet the desired deflection and length determined from prior calculations. Composite flex beam 106 is designed to accommodate landing of aircraft 104.

Composite flex beam 106 has design characteristics 120. Design characteristics 120 are selected such that landing gear system 102 desirably functions during operations of aircraft 104. Design characteristics 120 are selected such that landing gear system 102 provides aircraft 104 with desired performance. Design characteristics 120 include strength 122 and deflection 124. Designing composite flex beam 106 to meet design characteristics 120 takes into account cross-sectional thickness (not depicted) of composite flex beam 106, radius 112, and moment arm length (not depicted) of composite flex beam 106.

Composite flex beam 106 has strength 122 sufficient to carry the load created on composite flex beam 106 during landing of aircraft 104. Strength 122 takes into account thickness (not depicted) of composite flex beam 106, width 166, moment arm length (not depicted) of composite flex beam 106, radius 112, and torsional moment arm (not depicted) of composite flex beam 106. Stitching 108 increases strength 122 of composite flex beam 106.

Composite flex beam 106 has deflection 124. Deflection 124 is a measure of the flex of composite flex beam 106. Composite flex beam 106 deflects to absorb the landing energy of aircraft 104. Deflection 124 can be measured in Z-direction 126 or as angular deflection 128. Deflection 124 is a maximum acceptable deflection value for composite flex beam 106. The maximum acceptable deflection value will vary depending on the design of aircraft 104.

Composite flex beam 106 is configured to deflect a prescribed amount. In some illustrative examples, composite flex beam 106 is configured to have deflection 124, a maximum acceptable deflection value, of between 12 inches and 16 inches in Z-direction 126 of composite flex beam 106. In some illustrative examples, composite flex beam 106 is configured to have deflection 124, a maximum acceptable deflection value, of between 12 inches and 14 inches in Z-direction 126 of composite flex beam 106. In some illustrative examples, composite flex beam 106 is configured to accommodate angular deflection 128 due to bending of up to 15 degrees.

Deflection 124 and angular deflection 128 occur when a load is applied to composite flex beam 106. Deflection 124 and angular deflection 128 occur when aircraft 104 lands. Deflection 124 accommodated by composite flex beam 106 is accommodated due to fiber orientations of fiber layers 134, material of resin 136, material of fibers in fiber layers 134, curvature 110, placement of trunnion 114 relative to composite flex beam 106, and features of stitching 108 including density 142, material of stitching 108, and thickness of stitching 108.

Deflection 124 can also be expressed as a difference between relaxed radius 130 of composite flex beam 106 and fully deflected radius 132 of composite flex beam 106. Relaxed radius 130 is radius 112 of composite flex beam 106 when composite flex beam 106 has a minimum load or no load, for example when aircraft 104 is in flight. Relaxed radius 130 is radius 112 of composite flex beam 106 when aircraft 104 is in flight. Fully deflected radius 132 of composite flex beam 106 is radius 112 of composite flex beam 106 when composite flex beam has a maximum designed load. Fully deflected radius 132 of composite flex beam 106 is radius 112 of composite flex beam 106 during a dynamic situation, such as landing aircraft 104.

To form composite flex beam 106, fiber layers 134 are laid up on a tool (not depicted). When laid up on the tool, fiber layers 134 are dry layers of unidirectional fibers. The unidirectional fibers are oriented in any desirable direction relative to the neutral surface. Traditional fiber orientations include 0 degrees, (+/−) 30 degrees, (+/−) 45 degrees, (+/−) 60 degrees, and 90 degrees relative to the neutral surface. In some illustrative examples, fiber layers 134 include at least one fiber layer of fiber layers 134 that has a non-traditional fiber orientation.

Fiber layers of fiber layers 134 within the (+/−) 30 and (+/−) 60 degree range handle the torsion loads (drag) on composite flex beam 106. Bending is handled by fiber layers of fiber layers 134 having a fiber orientation of approximately 0 degrees. Fiber layers with a fiber orientation of approximately 0 degrees are aligned with length 148 of composite flex beam 106. In some illustrative examples, non-traditional fiber orientations up to 10 degrees, such as 5 degrees, accommodate bending of composite flex beam 106.

(+/−) 45 degree plies, which also may be called BETA plies, provide several functions in a layup. The (+/−) 45 degree plies re-route loads around a drilled hole, provide shear strength (Fs), provide shear stiffness (G), prevent lengthwise splitting in the 0 degree plies, and boost bearing strength in a bolted joint. By boosting bearing strength in the bolted joint, the BETA plies prevent splitting and shear out in the bolted joint. Shear stiffness (G) drives torsional rigidity, which enables wheels of wheel assembly 150 and wheel assembly 152 to track properly. An undesirably torsionally limber leg of composite flex beam 106 would allow a wheel to undesirably lose tracking.

Although BETA plies may be (+/−) 45 degree plies, BETA plies can range from (+/−) 15 degrees to (+/−) 75 degrees. In some illustrative examples, non-traditional fiber orientations between (+/−) 15 degrees and (+/−) 75 degrees are provided to re-route loads around a drilled hole, provide shear strength (Fs), provide shear stiffness (G), prevent lengthwise splitting in the 0 degree plies, and boost bearing strength in a bolted joint.

A quantity of fiber layers 134 and a stacking sequence (ply sequence, angle, thickness, and ply material) of fiber layers 134 are selected based on a design for aircraft 104. Changing at least one of a size, a weight, or a desired performance of aircraft 104 changes a design for composite flex beam 106. For example, changing at least one of a size, a weight, or a desired performance of aircraft 104 may also change a desired quantity or a desired stacking sequence of fiber layers 134.

Composite flex beam 106 flexes to absorb energy. The amount of flexure is related to Young's modulus of elasticity in the lengthwise direction (Ex) of composite flex beam 106. Young's modulus of elasticity in the lengthwise direction (Ex) is driven by the stacking sequence (ply sequence, angle, thickness, and ply material) of fiber layers 134. The percentage of 0 degree fiber layers in fiber layers 134 is determined to produce a desired Young's modulus of elasticity in the lengthwise direction (Ex). In one illustrative example, 0 degree fiber layers are approximately 50% of fiber layers 134. In one illustrative example, approximately 10% of fiber layers 134 are 90 degree layers. Fiber layers 134 include any desirable type of fibers. In some illustrative examples, fiber layers 134 include carbon fibers. In some illustrative examples, fiber layers 134 include fiberglass. After laying up fiber layers 134, stitching 108 is applied through fiber layers 134.

Stitching 108 is created by inserting a threaded needle (not depicted) through fiber layers 134. Fiber layers 134 are dry when stitching 108 is applied. Pre-impregnated composite material or "prepreg" would undesirably transfer resin to the needle, affecting the insertion and removal of the needle. Additionally resin in a prepreg material may prevent the fibers from temporarily displacing as the needle is inserted and from and bouncing back after the needle has been removed. Without local fiber movement, the fibers would potentially be damaged and/or have an undesirable or displaced position. Undesirable transfer of resin to the needle, or undesirable displacement of the fibers would undesirably affect the quality of the resulting product.

Stitching 108 is also referred to as through-thickness reinforcement or through-thickness stitching. Through-thickness stitching, stitching 108, extends across an entirety of composite flex beam 106. In some illustrative examples, stitching 108 passes normal/perpendicular through each layer of fiber layers 134. As a result, stitching 108 passes normal/perpendicular though each of the plies of composite flex beam 106. By stitching 108 passing normal/perpendicular though each of the plies of composite flex beam 106, stitching 108 provides fibers normal/perpendicular to the plane of the laminate, composite flex beam 106. Stitching 108 helps resist interlaminar shear stresses.

Although stitching 108 is described above as passing through normal/perpendicular to each of the plies of composite flex beam 106, in some illustrative examples, stitching 108 extends through each of the plies at an angle. In these illustrative examples, stitching 108 helps resist interlaminar shear stresses by providing a load path between the plies beyond the matrix of the resin. By having stitching 108 extend through each of the plies at an angle, stitching 108 increases the three-dimensional nature of the laminate of composite flex beam 106.

Stitching 108 is formed of any desirable material. Material for stitching 108 is selected to achieve desired strength 122. Material for stitching 108 is selected to be compatible with the material of fiber layers 134. Material for stitching 108 is selected to be compatible with resin 136. Material for stitching 108 is selected to maintain desirable qualities after experiencing curing temperatures. In some illustrative examples, stitching 108 is a carbon stitching. In some illustrative examples, stitching 108 is a polymeric stitching. In some illustrative examples, stitching 108 is one of polyamide fibers, polyester fibers, polyaramid fibers, or other types of polymers. In some illustrative examples, stitching 108 is a polyester stitching. In some illustrative examples, stitching 108 is formed of nylon. In some illustrative examples, stitching 108 comprises more than one material.

After applying stitching 108 through fiber layers 134, resin 136 is infused into fiber layers 134. Applying stitching 108 through fiber layers 134 along length 148 of curvature 110 forms reinforced plurality of layers 137. Resin 136 is infused into reinforced plurality of layers 137. Infusing resin 136 into reinforced plurality of layers 137 forms a resin infused curved structure (not depicted). The resin infused curved structure (not depicted) comprises composite 140. Curing the resin infused curved structure (not depicted) creates composite flex beam 106.

Resin 136 is infused into reinforced plurality of layers 137 using resin infusion equipment 138 to form composite 140. Resin infusion equipment 138 takes any desirable form. Some non-limiting examples of the types of resin infusion performed by resin infusion equipment 138 includes resin transfer molding (RTM), resin infusion (RI), controlled atmospheric pressure resin infusion (CAPRI), vacuum assisted resin transfer molding (VARTM), or any other desirable method of infusing resin 136 into fiber layers 134. In resin transfer molding, a tool encloses the part. After the fiber layers are placed in the tool, the tool lid is closed, and then the resin is shot into the tool. In resin infusion, the dry fiber layers are placed on a tool/mold, and are then covered by a vacuum bag. The resin is then flowed between the bag and the part or the tool and the part. In controlled atmospheric pressure resin infusion, fine tuning of the pressures is used to avoid outgassing of the resin.

Composite 140 is cured to form composite flex beam 106. Composite 140 is cured using at least one of pressure and temperature.

Stitching 108 increases strength 122 of composite flex beam 106 by providing support in Z-direction 126. Stitching 108 helps resist interlaminar shear stresses. Stitching 108 reduces or eliminates out-of-tolerance inconsistencies in composite flex beam 106 during operation of aircraft 104. Stitching 108 prevents or arrests any de-laminations in composite flex beam 106 due to loads applied to composite flex beam 106. Stitching 108 prevents plies of composite flex beam 106 from being pulled apart as composite flex beam 106 bends. Stitching 108 prevents laminate layer shearing/slipping relative to each other when a load is applied to composite 140 of composite flex beam 106. Stitching 108 helps resist interlaminar shear stresses.

Stitching 108 has density 142 in composite flex beam 106. Density 142 is a measure of how many times stitching 108 extends through the thickness of fiber layers 134 in an area. When density 142 is greater, stitching 108 extends through fiber layers 134 a greater number of times in the same area.

In some illustrative examples, density 142 of stitching 108 is greater near leading edge 143 and trailing edge 144 of composite flex beam 106. Leading edge 143 and trailing edge 144 are opposite edges of width 166 of composite flex beam 106.

In some illustrative examples, stitching 108 is in grid pattern 154. Grid pattern 154 has cell size 156. Cell size 156 is the length of each stitch in-plane. In some illustrative examples, cell size 156 can be up to 2 inches. In some illustrative examples, grid pattern 154 has cell size 156 of between 0.2 inches and 0.5 inches. In some illustrative examples, grid pattern 154 has cell size 156 of between 0.125 inches and 0.5 inches.

When density 142 of stitching 108 is greater, cell size 156 is smaller. When density 142 of stitching 108 is greater near leading edge 143 and trailing edge 144 of composite flex beam 106, cell size 156 is smaller near leading edge 143 and trailing edge 144 of composite flex beam 106.

Trunnion 114 connects composite flex beam 106 to an airframe of aircraft 104. Trunnion 114 is positioned at least 0.1 inches above top surface 158 of composite flex beam 106. Offset 116 of trunnion 114 is determined based upon the dimensions and design characteristics 120 of composite flex beam 106.

In some illustrative examples, offset 116 is determined by taking into account loads to be applied to composite flex beam 106. Offset 116 of trunnion 114 is designed to reduce strains introduced to components of aircraft 104. Trunnion 114 is offset 116 between 0.1 inches and 10 inches from top surface 158 of composite flex beam 106.

By offsetting trunnion 114, movement of trunnion 114 during loading of composite flex beam 106 is reduced. Reducing the movement of trunnion 114 reduces strains introduced to components of aircraft 104 as composite flex beam 106 is flattened. In some illustrative examples, trunnion 114 is offset 116 such that movement of trunnion 114 due to flexing of composite flex beam 106 is minimized.

Selecting offset 116 is part of designing aircraft 104 and landing gear system 102. An acceptable value for offset 116 will be within desired tolerances for landing gear system 102 geometry characteristics and landing gear system 102 deformation characteristics. If other design aspects of aircraft 104 or landing gear system 102 are changed, offset 116 may also change.

After designing aircraft 104, determining deflection 124, performing tip over point calculations, determining spacing of wheel assembly 150 and wheel assembly 152, offset 116 is determined. Offset 116 is determined taking into account rotation of fitting 115, flattening out of composite flex beam 106, and angular deflection 128 of composite flex beam 106. For deflection 124, radius 112 moves between relaxed radius 130 to fully deflected radius 132. Due to deflection 124, center axis 159 of trunnion 114 has lateral movement.

Fitting 115 rotates as composite flex beam 106 experiences deflection. Fitting 115 rotates as composite flex beam 106 experiences deflection 124 and transitions from relaxed radius 130 to full deflected radius 132. Lateral displacement results from composite flex beam 106 flattening. Lateral displacement results from fitting 115 rotation. Lateral displacement results from composite flex beam 106 compression strains. The displacement of center axis 159 is a function of rotation angle and vertical offset.

A margin check is performed on the amount of strain induced by the displacement of fitting 115 of landing gear system 102 on the airframe (fuselage frames) of aircraft 104 that are connected to landing gear system 102. The amount of strain takes into account induced strains due to flattening of composite flex beam 106, compression of composite flex beam 106, and rotation of fittings connecting composite flex beam 106 to aircraft 104, including fitting 115. When the induced strains on the airframe of aircraft 104 connected to landing gear system 102 are an acceptable value, offset 116 is an acceptable value. In some illustrative examples, offset 116 is selected such that induced strains on the airframe of aircraft 104 connected to landing gear system 102 are minimized.

Offset 116 is selected such that movement of trunnion 114 has an acceptable value, wherein a maximum acceptable value of trunnion movement is based upon the design of aircraft 104 having trunnion 114. The maximum acceptable value for offset 116 is such that induced strains on surrounding aircraft structures due to movement of trunnion 114 when a load is applied to composite flex beam 106 are acceptable based on the design of aircraft 104. In some illustrative examples, the surrounding aircraft structures include the airframe of aircraft 104. Determining whether the induced strains on surrounding aircraft structures due to movement of trunnion 114 have an acceptable value is part of the margin checks on aircraft 104. Offset 116 has an acceptable value when induced strains on surrounding aircraft structures due to movement of trunnion 114 pass a margin check.

The acceptable value of induced strains will depend on the design of aircraft 104. If the design of aircraft 104 changes, the acceptable value of the induced strains may also change. If the design of aircraft 104 changes, the design of landing gear system 102, including the design of composite flex beam 106 may change. The amount of induced strains on surrounding aircraft structures is affected by the design of landing gear system 102, including the design of composite flex beam 106, offset 116, and attach point 168. Even if the acceptable value of induced strains is unchanged, margin checks are performed again on the new design of aircraft 104 to confirm the induced strains have an acceptable value. Margin checks are repeated as the design of aircraft 104 is modified. If the margin checks result in an out of tolerance condition, at least one of offset 116, attach point 168, the design of composite flex beam 106, or the design of another component of aircraft 104 is changed depending upon which margin check has an out of tolerance condition.

Figure 8:
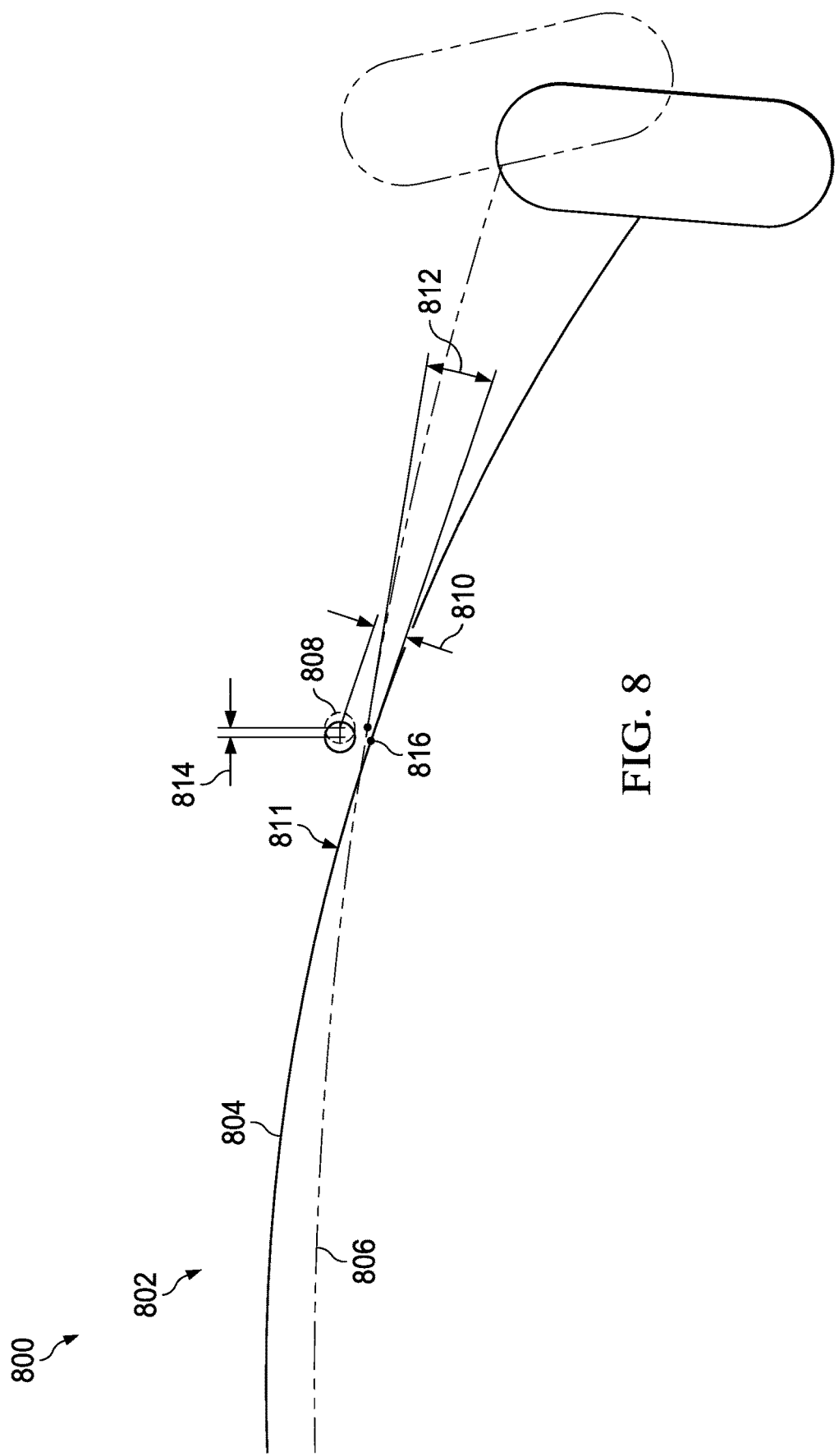
FIG. 8 is an illustration of a front view of a portion of a flex beam of a landing gear system of an aircraft in both a deflected state and a relaxed state in accordance with an illustrative embodiment.

Top surface 158 is convex 160. Bottom surface 162 of composite flex beam 106 is concave 164. When a load is applied to composite flex beam 106, radius 112 of composite flex beam 106 is increased from relaxed radius 130. When a load is applied to composite flex beam 106, top surface 158 flattens. As composite flex beam 106 flattens, strains are introduced to composite flex beam 106. Portions of top surface 158 of composite flex beam 106 experience compression. As composite flex beam 106 flattens, portions of composite flex beam 106 rotate, as can be seen in FIG. 8. As composite flex beam 106 flattens, a distance between attach point 168 and a second attach point (not depicted) of composite flex beam 106 increases. As composite flex beam 106 flattens, attach point 168 moves outward. As composite flex beam 106 flattens, a second attach point (not depicted) of a second fitting (not depicted) of composite flex beam 106 also moves outward. The distance between attach point 168 and the second attach point increases by a sum of the movement of both attach point 168 and the second attach point.

Offset 116 of trunnion 114 from top surface 158 is configured to reduce strains in aircraft 104 introduced by movement of trunnion 114 when composite flex beam 106 is loaded. Offset 116 is a distance between top surface 158 and center axis 159 of trunnion 114.

Base 117 of fitting 119 attaches trunnion 114 to composite flex beam 106. Base 117 is connected to composite flex beam 106 at attach point 168. Fitting 119 comprises base 117 and trunnion 114. Base 117 is connected to composite flex beam 106 at attach point 168. Attach point 168 on top surface 158 of composite flex beam 106 is selected to reduce strains in aircraft 104 introduced by movement of trunnion 114 when composite flex beam 106 is loaded. Placement of trunnion 114 relative to composite flex beam 106 influences the amount of movement of trunnion 114 due to flexing of composite flex beam 106. Attach point 168 on top surface 158 of composite flex beam 106 is selected to reduce movement of trunnion 114 when composite flex beam 106 is loaded.

First end 145 and second end 146 of composite flex beam 106 are opposite ends of length 148 of composite flex beam 106. First end 145 is associated with wheel assembly 150 of landing gear system 102 of aircraft 104. Second end 146 is associated with wheel assembly 152 of landing gear system 102 of aircraft 104.

In some illustrative examples, composite flex beam 106 has curvature 110 that extends across an entirety of length 148 of composite flex beam 106. By curvature 110 extending along an entirety of length 148, radius 112 is large.

In some illustrative examples, curvature 110 is constant 170. When curvature 110 is constant 170, composite flex beam 106 has a substantially same radius across composite flex beam 106. When curvature 110 is constant 170, composite flex beam 106 is a portion of a circle. In some illustrative examples, when curvature 110 is constant 170, composite flex beam 106 is semi-circular. In some illustrative examples, curvature 110 is varying 172. When curvature 110 is varying 172, curvature 110 does not have a same radius across the entirety of composite flex beam 106. In one illustrative example, when curvature 110 is varying 172, a cross-section through curvature 110 between leading edge 143 and trailing edge 144 of composite flex beam 106 is a portion of an oval.

Stitching 108, composite 140, and curvature 110 of composite flex beam 106 are selected based on design of aircraft 104 including size, weight, and designed load to meet design characteristics 120 for performance. Stitching 108, composite 140, and curvature 110 of composite flex beam 106 are selected to provide repeated flexing of composite flex beam 106 in operations of aircraft 104. Stitching 108, composite 140, and curvature 110 of composite flex beam 106 are selected to accommodate repeated dynamic loading to composite flex beam 106 during landings of aircraft 104 without introducing out-of-tolerance inconsistencies into composite flex beam 106.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, although not depicted, in some illustrative examples, width 166 of composite flex beam 106 narrows moving towards first end 145 and second end 146 of composite flex beam 106. In some illustrative examples, width 166 is greater at attach point 168 than at first end 145. In these illustrative examples, width 166 is greater near the halfway point (not depicted) of composite flex beam 106, near where composite flex beam 106 connects to an airframe (not depicted) of aircraft 104.

Stitching 108 is applied to fiber layers 134 in any desirable fashion and in any desirable pattern. Additionally, diameter of stitching 108 is not depicted in FIG. 1, but is selected based on design characteristics 120. In some illustrative examples, a diameter (not depicted) of stitching 108 varies within composite flex beam 106. In some illustrative examples, through-thickness stitching 108 has more than one thread diameter in composite flex beam 106.

Trunnion 114 is connected to composite flex beam 106 in any desirable fashion. Placement of trunnion 114 accommodates arc length changes during flexing of composite flex beam 106. In some illustrative examples, the type of attachment for trunnion 114 is a slip connection to further accommodate movement of trunnion 114.

Figure 2:
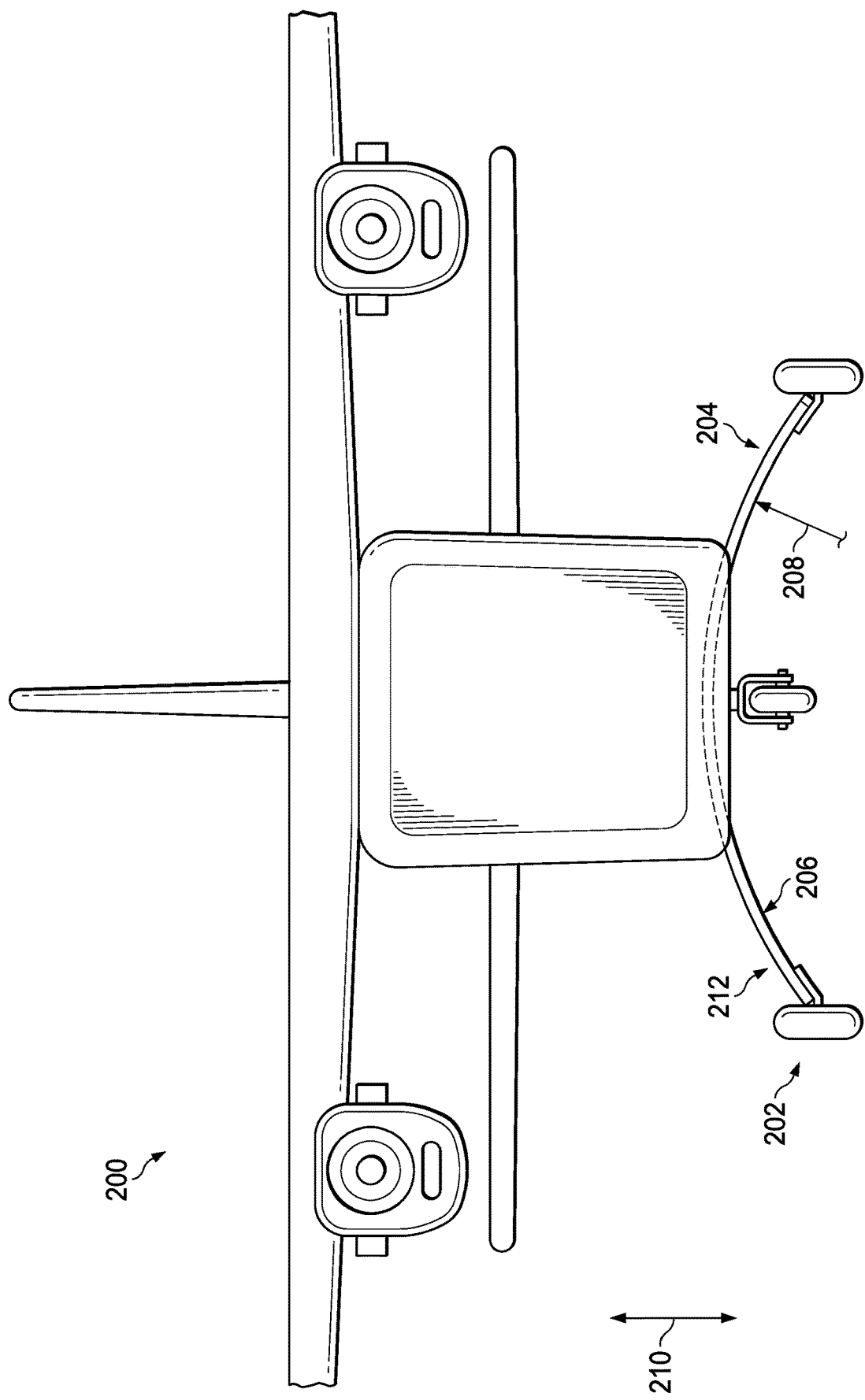
FIG. 2 is an illustration of a front view of an aircraft with a composite flex beam in a relaxed state in accordance with an illustrative embodiment.

Turning now to FIG. 2, an illustration of a front view of an aircraft with a composite flex beam in a relaxed state is depicted in accordance with an illustrative embodiment. Aircraft 200 is a physical implementation of aircraft 104 of FIG. 1.

Aircraft 200 has landing gear system 202. Landing gear system 202 comprises composite flex beam 204 with curvature 206 having a radius greater than 5 inches. As depicted, radius 208 is greater than 100 inches. Composite flex beam 204 has curvature 206 along the entirety of the length of composite flex beam 204.

As depicted, curvature 206 is a constant curvature. As depicted, composite flex beam 204 has radius 208 across the length of composite flex beam 204. However, in other non-depicted illustrative examples, curvature 206 is a varying curvature with a varying radius.

Figure 3:
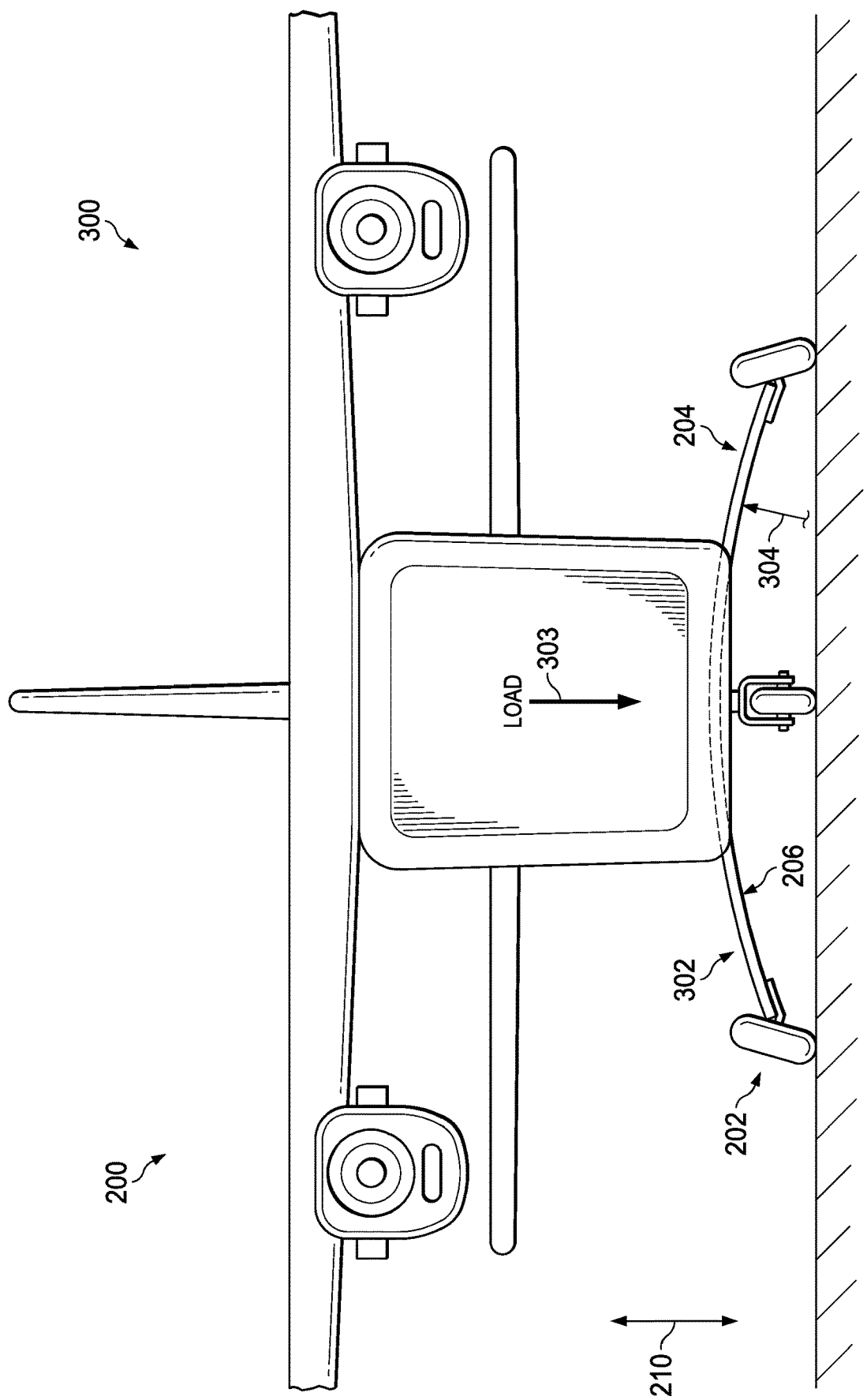
FIG. 3 is an illustration of a front view of an aircraft with a composite flex beam in a deflected state in accordance with an illustrative embodiment.

Composite flex beam 204 is configured to have a maximum acceptable deflection value of between 12 inches and 16 inches in Z-direction 210 of composite flex beam 204. In some illustrative examples, composite flex beam 204 is configured to have a maximum acceptable deflection value of between 12 inches and 14 inches in Z-direction 210 of composite flex beam 204. In some illustrative examples, composite flex beam 204 is configured to have a maximum acceptable deflection value of between 14 inches and 16 inches in Z-direction 210 of composite flex beam 204. A deflection of composite flex beam 204 is depicted in FIG. 3. Composite flex beam 204 is configured to accommodate an angular deflection of up to 15 degrees.

As depicted, composite flex beam 204 is in relaxed state 212. Radius 208 may be referred to as a relaxed radius.

Although not visible in FIG. 2, composite flex beam 204 has through-thickness reinforcement in the form of through-thickness stitching. Composite flex beam 204 has through-thickness stitching (not depicted) and curvature 206 along an entirety of the length of composite flex beam 204.

Turning now to FIG. 3, an illustration of a front view of an aircraft with a composite flex beam in a deflected state is depicted in accordance with an illustrative embodiment. View 300 of FIG. 3 is a view of composite flex beam 204 in deflected state 302. Composite flex beam 204 is in deflected state 302 due to load 303 placed on composite flex beam 204 during landing of aircraft 200. Composite flex beam 204 has flattened between relaxed state 212 and deflected state 302. Composite flex beam 204 has increased its radius between relaxed state 212 and deflected state 302. In deflected state 302, radius 304 of composite flex beam 204 is greater than radius 208 of FIG. 2. Radius 304 is referred to as a deflected radius. As depicted, radius 304 is greater than 200 inches.

As composite flex beam 204 is flexed, curvature 206 is "opened" as radius 208 of FIG. 2 increases to radius 304. As curvature 206 is "opened", radial forces emerge in composite flex beam 204. The through-thickness stitching (not depicted) of composite flex beam 204 provides out-of-plane strength. The through-thickness reinforcement (through-thickness stitching) (not depicted) suppresses inconsistencies in composite flex beam 204 due to radial forces.

Figure 4:
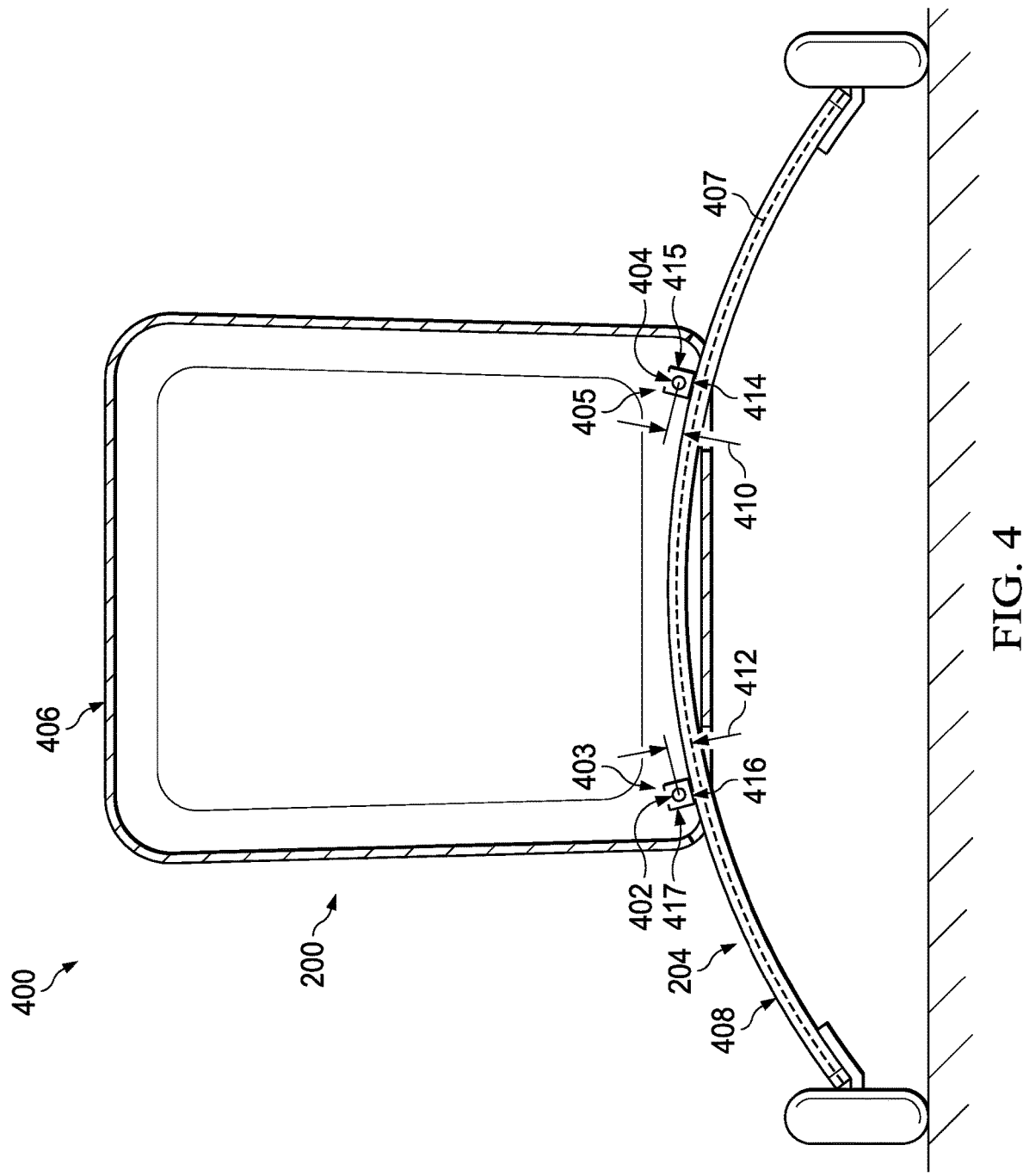
FIG. 4 is an illustration of a cross-sectional view of an aircraft with a composite flex beam in accordance with an illustrative embodiment.

Turning now to FIG. 4, an illustration of a cross-sectional view of an aircraft with a composite flex beam is depicted in accordance with an illustrative embodiment. View 400 is a cross-sectional view of aircraft 200 of FIGS. 2-3. In view 400, trunnion 402 and trunnion 404 are visible. In view 400, trunnion 402 and trunnion 404 have circular cross-sections. Trunnion 402 is part of fitting 403. Trunnion 404 is part of fitting 405.

Fitting 403 and fitting 405 connect composite flex beam 204 to fuselage 406 of aircraft 200. As depicted, center axis of trunnion 402 and center axis of trunnion 404 are both offset relative to a neutral surface 407 of composite flex beam 204. As depicted, the center axis of trunnion 402 and the center axis of trunnion 404 are each offset at least 0.1 inches from top surface 408 of composite flex beam 204. As depicted, offset 410 of the center axis of trunnion 404 from top surface 408 is greater than 0.1 inches. Offset 412 of the center axis of trunnion 402 from neutral surface 407 is also depicted.

By offsetting trunnion 402 and trunnion 404, movement of trunnion 402 and trunnion 404 due to deflection of composite flex beam 204 is controlled. Trunnion 402 is connected to composite flex beam 204 by base 417 of fitting 403. Trunnion 404 is connected to composite flex beam 204 by base 415 of fitting 405. Offset 412 of trunnion 402 is set by design of base 417. Offset 410 of trunnion 404 is set by design of base 415. Placements of trunnion 402 and trunnion 404, including offset 410 and offset 412 as well as attach point 414 of base 415 of fitting 405 and attach point 416 of base 417 of fitting 403, are selected to reduce strains on surrounding aircraft structures due to movement of trunnion 402 and trunnion 404 when a load is applied to composite flex beam 204. Placements of attach point 414 of fitting 403 and attach point 416 of fitting 405 along length of composite flex beam 204 are selected to reduce strains on surrounding aircraft structures due to movement of trunnion 402 and trunnion 404 when a load is applied to composite flex beam 204. Placement of attach point 414 and offset 412 of trunnion 402 are based on designs for composite flex beam 204 including radius 208 of FIG. 2, a maximum deflection for composite flex beam 204, and expected loads for aircraft 200. Placement of attach point 416 and offset 410 of trunnion 404 are based on designs for composite flex beam 204 including radius 208 of FIG. 2, a maximum deflection for composite flex beam 204, and expected loads for aircraft 200.

Figure 5:
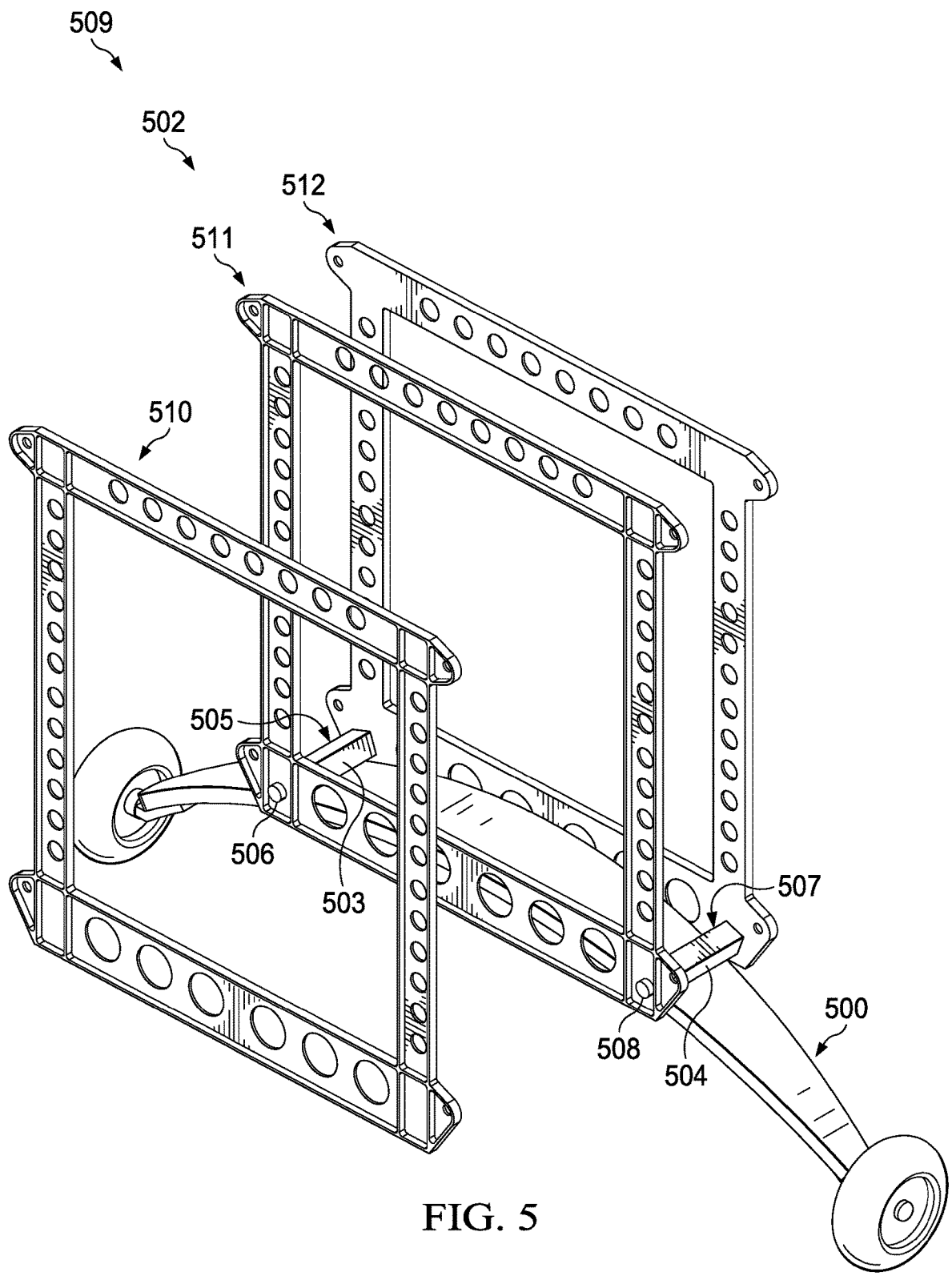
FIG. 5 is an illustration of an isometric view of a landing gear system of an aircraft with a composite flex beam in accordance with an illustrative embodiment.

Turning now to FIG. 5, an illustration of an isometric view of a landing gear system of an aircraft with a composite flex beam is depicted in accordance with an illustrative embodiment. Composite flex beam 500 is a physical implementation of composite flex beam 106 of FIG. 1.

As depicted, composite flex beam 500 is joined to airframe 502 by fitting 503 and fitting 504. Fitting 503 includes base 505 and trunnion 506. Fitting 504 includes base 507 and trunnion 508. As depicted, trunnion 506 and trunnion 508 are positioned above the neutral surface of composite flex beam 500. As depicted, trunnion 506 and trunnion 508 are at least 0.1 inches above top surface of composite flex beam 500.

View 509 is a simplified view of connections between composite flex beam 500 and components of an aircraft. Airframe 502 includes frame 510, frame 511, and frame 512. Frame 510 connects to wings (not depicted) of the aircraft and a strut (not depicted). Frame 511 connects to wings (not depicted) of the aircraft and composite flex beam 500. Frame 512 connects to composite flex beam 500.

Figure 6:
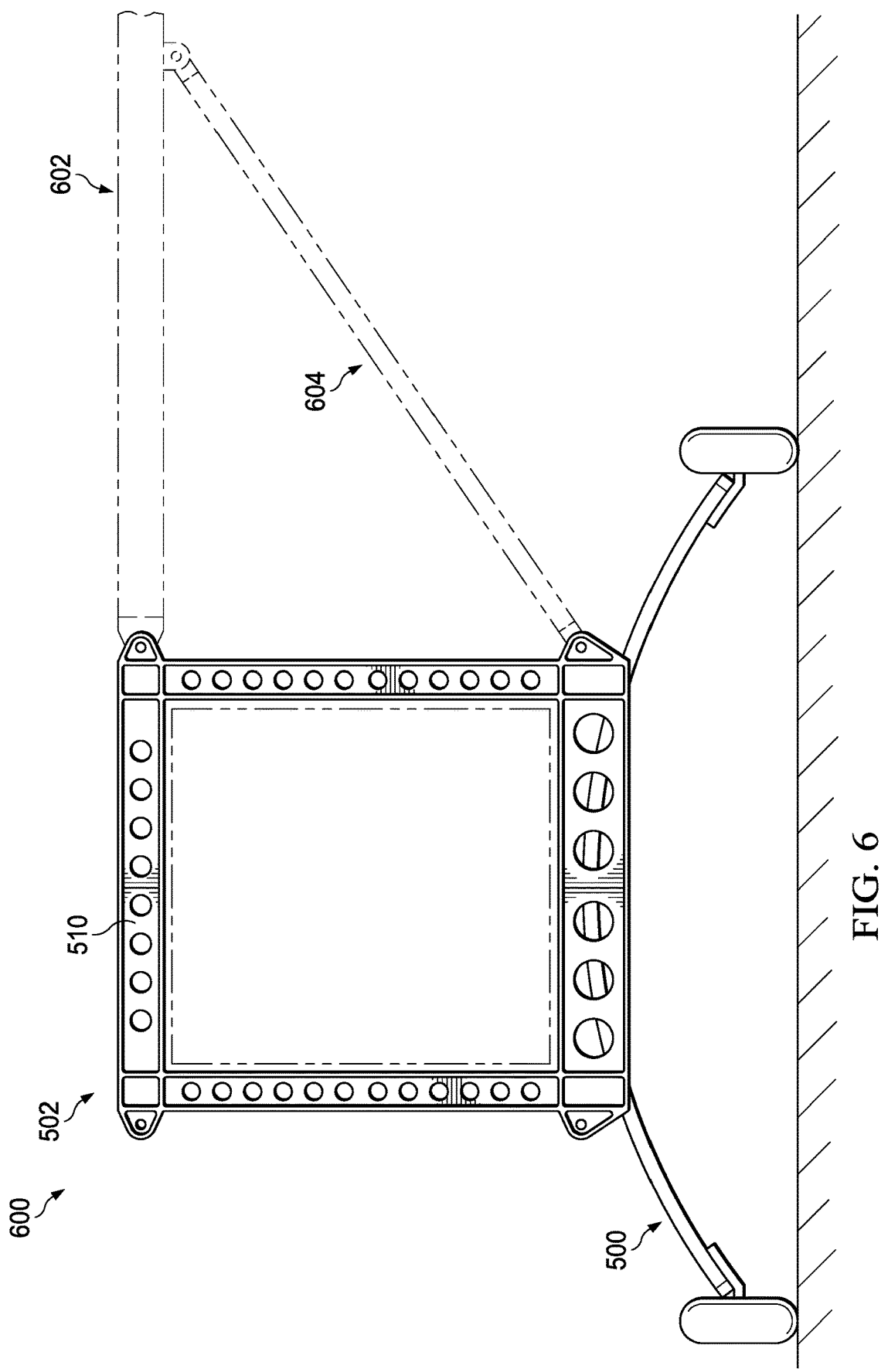
FIG. 6 is an illustration of a front view of a landing gear system of an aircraft with a composite flex beam in accordance with an illustrative embodiment.

Turning now to FIG. 6, an illustration of a front view of a landing gear system of an aircraft with a composite flex beam is depicted in accordance with an illustrative embodiment. View 600 is a front view of airframe 502 and composite flex beam 500. In view 600, additional components of an aircraft are depicted in phantom. For example, wing 602 is depicted in phantom. Wing 602 is connected to frame 510. Wing 602 is also connected to strut 604 shown in phantom. Strut 604 is also connected to frame 510.

Figure 7:
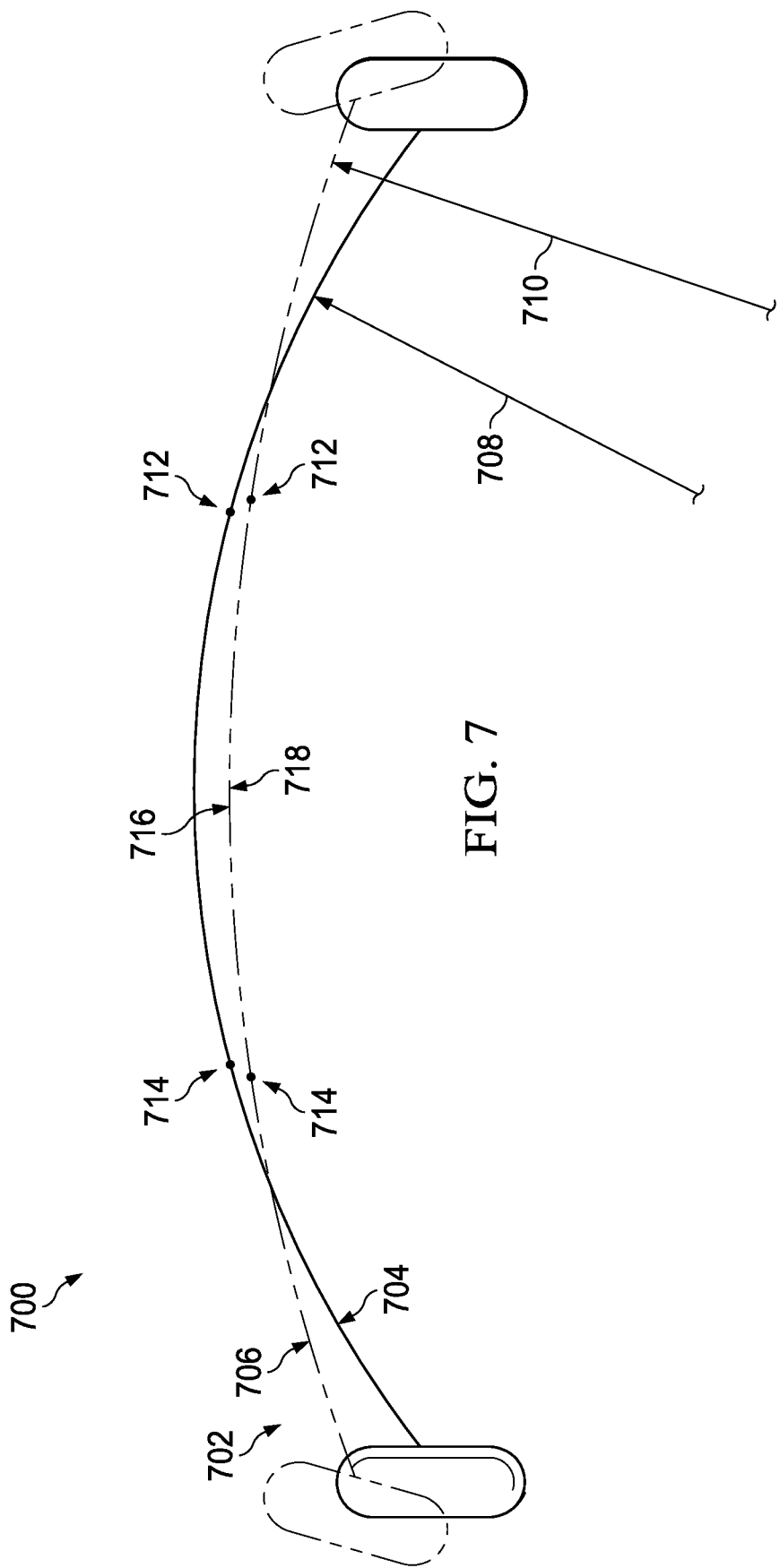
FIG. 7 is an illustration of a front view of a flex beam of a landing gear system of an aircraft in both a deflected state and a relaxed state in accordance with an illustrative embodiment.

Turning now to FIG. 7, an illustration of a front view of a flex beam of a landing gear system of an aircraft in both a deflected state and a relaxed state is depicted in accordance with an illustrative embodiment. View 700 depicts the movement of composite flex beam 702 as a load is applied to composite flex beam 702. In view 700, composite flex beam 702 is shown in both relaxed state 704 and fully deflected state 706.

In relaxed state 704, composite flex beam 702 has relaxed radius 708. In fully deflected state 706, composite flex beam 702 has fully deflected radius 710. In relaxed state 704, a load on composite flex beam 702 consists of the attached wheel assemblies. In fully deflected state 706, the load is greater than the reacted load due to a fully loaded plane making a dynamic landing.

When composite flex beam 702 absorbs the load of landing, composite flex beam 702 goes from relaxed radius 708 to a deflected radius, such as fully deflected radius 710. As can be seen in view 700, as composite flex beam 702 absorbs the load of landing, composite flex beam 702 flattens out. The distance between the attachment points of composite flex beam 702 increases as composite flex beam 702 flattens out.

In view 700, composite flex beam 702 has attach point 712 and attach point 714. Between relaxed radius 708 and fully deflected radius 710, attach point 712 and attach point 714 each move outward. The distance between of composite flex beam 702 increases by the sum of the distance each of attach point 712 and attach point 714 move outward.

As composite flex beam 702 flattens, upper compression surface 716 shortens. As composite flex beam 702 is loaded, the material in composite flex beam 702 strains. Upper compression surface 716 gets shorter with an applied load. Lower surface 718 gets longer with an applied load.

At attach point 712, composite flex beam 702 rotates, as shown in more detail in FIG. 8. As a result of rotation of attach point 712, an attached trunnion (not depicted) will also move. It is desirable to offset a trunnion (not depicted) above composite flex beam 702 so that movement towards attach point 714 has an acceptable value. An acceptable value is determined based upon the design of the aircraft having the trunnion. An acceptable value takes into account strains introduced into the design of the aircraft.

If a trunnion (not depicted) were to be below upper compression surface 716 of composite flex beam 702, movement of the trunnion during loading is in an undesirable direction. If a trunnion (not depicted) were to be below upper compression surface 716 of composite flex beam 702, movement of the trunnion during loading would add stress to the overall aircraft fuselage and landing gear assemblies.

Attachment of composite flex beam 702 to the fuselage (not depicted) consists of rotating supports, including trunnions (not depicted), located above composite flex beam 702, so as to cancel out the mismatch between composite beam flattening and compression strains. By placing attach point 712 and attach point 714 at desirable locations and offsetting trunnions (not depicted) from neutral surface of composite flex beam 702, mismatch between composite beam flattening and compression strains will cancel out. By placing attach point 712 and attach point 714 at desirable locations and offsetting trunnions (not depicted) from neutral surface of composite flex beam 702, the strains in the attachments, frames, and aircraft structure are reduced.

Turning now to FIG. 8, an illustration of a front view of a portion of a flex beam of a landing gear system of an aircraft in both a deflected state and a relaxed state is depicted in accordance with an illustrative embodiment. View 800 depicts the movement of composite flex beam 802 as a load is applied to composite flex beam 802. In view 800, a portion of composite flex beam 802 is shown in both relaxed state 804 and fully deflected state 806.

Trunnion 808 is connected to composite flex beam 802. Connections between trunnion 808 and composite flex beam 802 are not shown for clarity and visibility of movement of trunnion 808. Trunnion 808 is connected to composite flex beam 802 in any desirable fashion and using any desirable mechanical connections. Trunnion 808 is connected through a mechanical connection (not depicted) to attach point 816 on composite flex beam 802. The mechanical connection creates offset 810. Trunnion 808 has offset 810 from top surface 811 of composite flex beam 802. As depicted, offset 810 is approximately 2 inches.

Composite flex beam 802 flattens as it flexes between relaxed state 804 and fully deflected state 806. Composite flex beam 802 undergoes angular deflection as it flattens. Composite flex beam 802 has undergone angular deflection 812 between relaxed state 804 and fully deflected state 806. As depicted, angular deflection 812 is approximately 9.3 degrees. Angular deflection 812 is only one non-limiting example of a value for an angular deflection of composite flex beam 802 due to dynamic loading. Composite flex beam 802 is configured to accommodate an angular deflection of up to 15 degrees. An amount of angular deflection experienced by composite flex beam 802 is affected by the amount of load placed onto composite flex beam 802. Introducing a larger load increase the amount that composite flex beam 802 flexes and also increases the amount of angular deflection of composite flex beam 802. In some illustrative examples, the angular deflection of composite flex beam 802 may also be referred to as a rotation of composite flex beam 802.

When composite flex beam 802 goes through angular deflection 812, center of trunnion 808 moves inward distance 814. As depicted, distance 814 is smaller than movement of attach point 816. As depicted, distance 814 is less than half an inch. As depicted, movement of attach point 816 is more than half an inch. As a result of placement of trunnion 808, including offset 810 and location of attach point 816, displacement of center of trunnion 808 is an acceptable value and desirable direction.

Offset 810 reduces movement of trunnion 808. If trunnion 808 were positioned at attach point 816, movement of trunnion 808 due to angular deflection 812 of composite flex beam 802 would be greater. By reducing movement of trunnion 808, strains introduced into an attached airframe (not depicted) are reduced.

Figure 9:
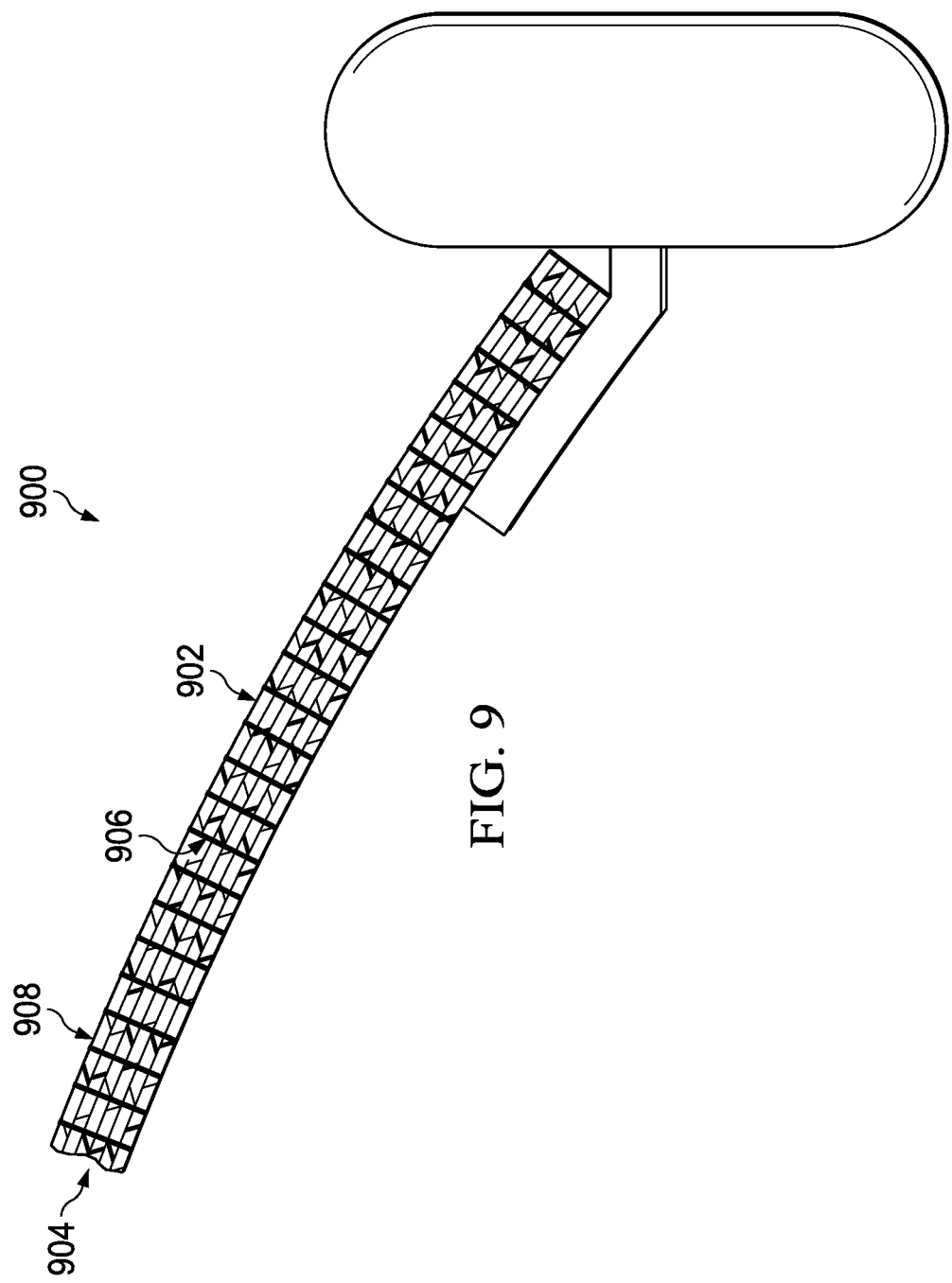
FIG. 9 is an illustration of a cross-sectional view of stitching of a leading edge of a composite flex beam of an aircraft in accordance with an illustrative embodiment.

Turning now to FIG. 9, an illustration of a cross-sectional view of stitching of a first end of a composite flex beam of an aircraft is depicted in accordance with an illustrative embodiment. View 900 is a cross-sectional view through a portion of composite flex beam 902. Composite flex beam 902 is a physical implementation of composite flex beam 106 of FIG. 1. As depicted, composite flex beam 902 has fiber layers 904 with through-thickness stitching 906. View 900 is simplified view of a cross-section through composite flex beam 902 for illustrative purposes only. Any desirable quantity of layers is present in fiber layers 904. View 900 is a cross-sectional view through composite material 908 formed of fiber layers 904 infused with resin and cured. Cross-hatching is depicted in composite material 908.

Through-thickness stitching 906 improves out-of-plane strength of composite flex beam 902. Stitching 906 suppresses inconsistencies in composite flex beam 902 due to interlaminar tensile stress. Stitching 906 provides mechanical connections between the layers of composite flex beam 902 to reduce or eliminate out-of-tolerance inconsistencies. Stitching 906 prevents layers of composite flex beam 902 from being pulled apart as composite flex beam 902 bends. Stitching 906 helps resist interlaminar stresses better than just resin alone. Stitching 906 resists movement of the plies relative to each other when composite flex beam 902 flexes. Additionally, stitching 906 arrests any delaminations developing between layers of composite flex beam 902.

Figure 10:
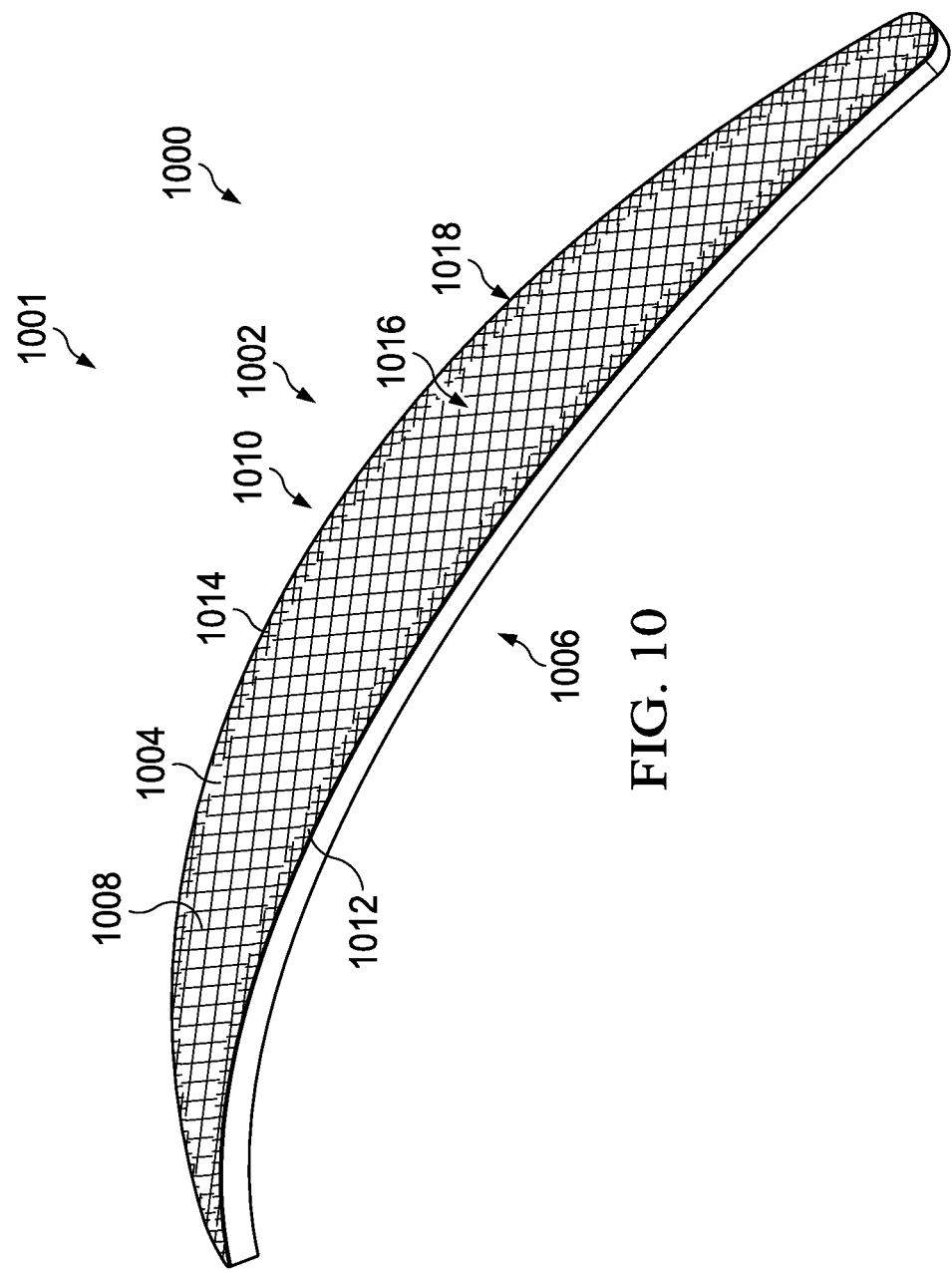
FIG. 10 is an illustration of an isometric view of distribution of stitching in a composite flex beam of an aircraft in accordance with an illustrative embodiment.

Turning now to FIG. 10, an illustration of an isometric view of distribution of stitching in a composite flex beam of an aircraft is depicted in accordance with an illustrative embodiment. View 1000 is a view of reinforced plurality of layers 1001. Reinforced plurality of layers 1001 is formed by applying stitching 1002 in fiber layers 1004. In view 1000, resin has not yet been infused into reinforced plurality of layers 1001. Each of fiber layers 1004 is dry. Fiber layers 1004 have been formed into curvature 1006 prior to adding stitching 1002 to form reinforced plurality of layers 1001.

Stitching 1002 extends over the entirety of fiber layers 1004. As depicted, stitching 1002 has grid pattern 1008. Density 1010 of stitching 1002 increases near leading edge 1012. Density 1010 of stitching 1002 also increases near trailing edge 1014. Density 1010 of stitching 1002 is greater in areas that experience the greatest possibility of delamination.

Grid pattern 1008 can have cell sizes up to 2 inches. In some illustrative examples, grid pattern 1008 has cell sizes in the range of 0.125 inches to 0.5 inches. Near leading edge 1012 and trailing edge 1014, cell size 1016 is smaller than cell size 1018 between leading edge 1012 and trailing edge 1014. A smaller cell size provides greater strength against interlaminar shear stresses. A smaller cell size also provides greater delamination arresting properties.

Figure 11:
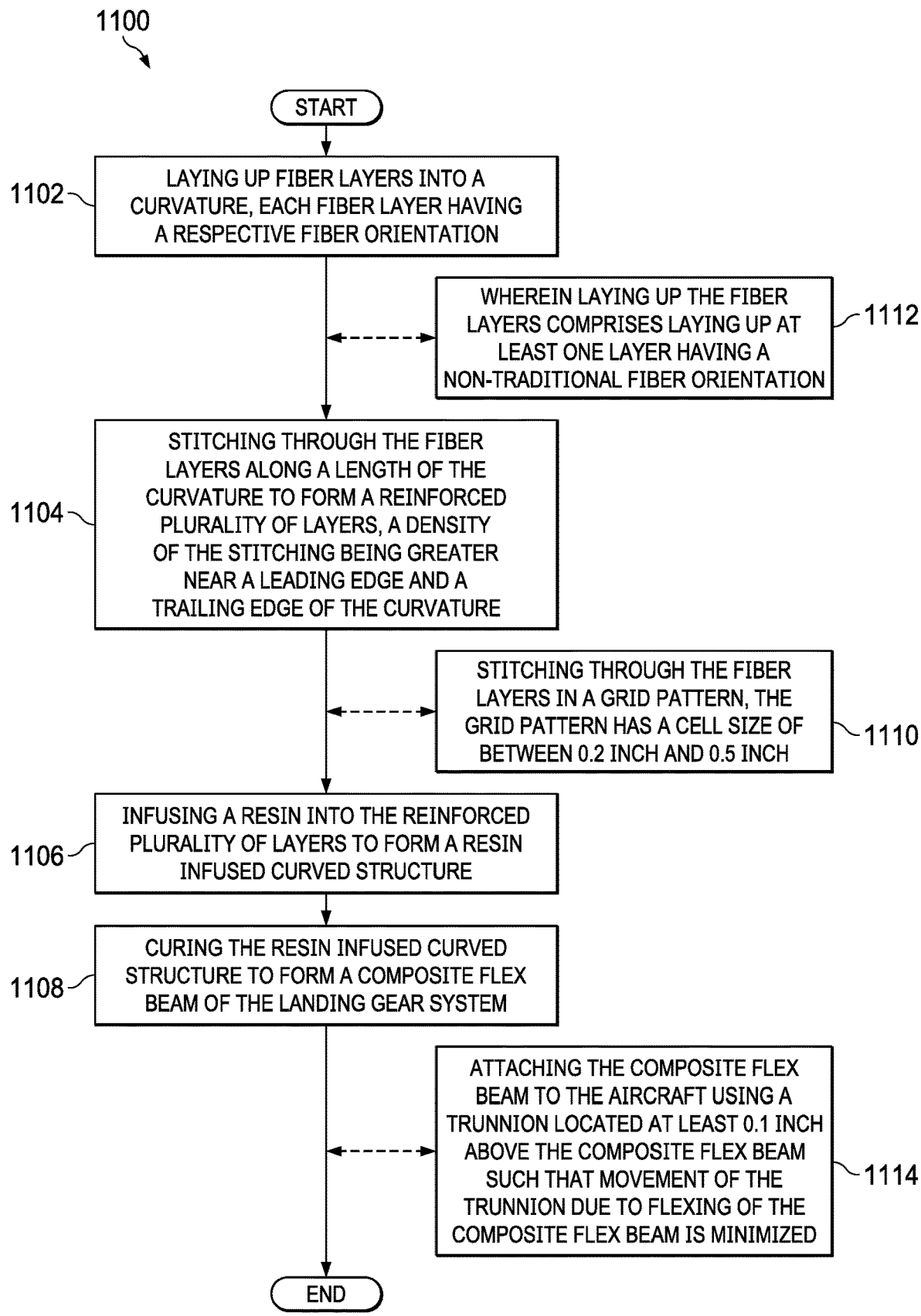
FIG. 11 is an illustration of a flowchart of a method of forming a landing gear system for an aircraft in accordance with an illustrative embodiment.

Turning now to FIG. 11, an illustration of a flowchart of a method of forming a landing gear system for an aircraft is depicted in accordance with an illustrative embodiment. Method 1100 may be used to form landing gear system 102 of FIG. 1. Method 1100 may be used to form composite flex beam 204 of FIGS. 2-4. Method 1100 may be used to form composite flex beam 500 of FIGS. 5-6. Method 1100 may be used to form composite flex beam 702 of FIG. 7. Method 1100 may be used to form composite flex beam 802 of FIG. 8. Method 1100 may be used to form composite flex beam 902 of FIG. 9. Operations of method 1100 may be implemented in FIG. 10 in applying stitching 1002.

Method 1100 lays up fiber layers 134 into a curvature 110, each fiber layer having a respective fiber orientation (operation 1102). Method 1100 stitches through the fiber layers 134 along a length 148 of the curvature 110 to form a reinforced plurality of layers 137, a density 142 of the stitching 108 being greater near a leading edge 143 and a trailing edge 144 of the curvature 110 (operation 1104). Method 1100 infuses a resin 136 into the reinforced plurality of layers 137 to form a resin infused curved structure (operation 1106). Method 1100 cures the resin infused curved structure to form a composite flex beam 106 of the landing gear system 102 (operation 1108). Afterwards, method 1100 terminates.

In some illustrative examples, stitching 108 comprises stitching 108 through the fiber layers 134 in a grid pattern 154, the grid pattern 154 has a cell size 156 of between 0.2 inches and 0.5 inches (operation 1110). In some illustrative examples, laying up the fiber layers 134 comprises laying up at least one layer having a non-traditional fiber orientation (operation 1112).

In some illustrative examples, method 1100 attaches the composite flex beam 106 to the aircraft 104 using a trunnion 114 located at least 0.1 inches above the composite flex beam 106 (operation 1114). Offset 116 of trunnion 114 is designed to reduce stresses introduced to components of aircraft 104.

Figure 12:
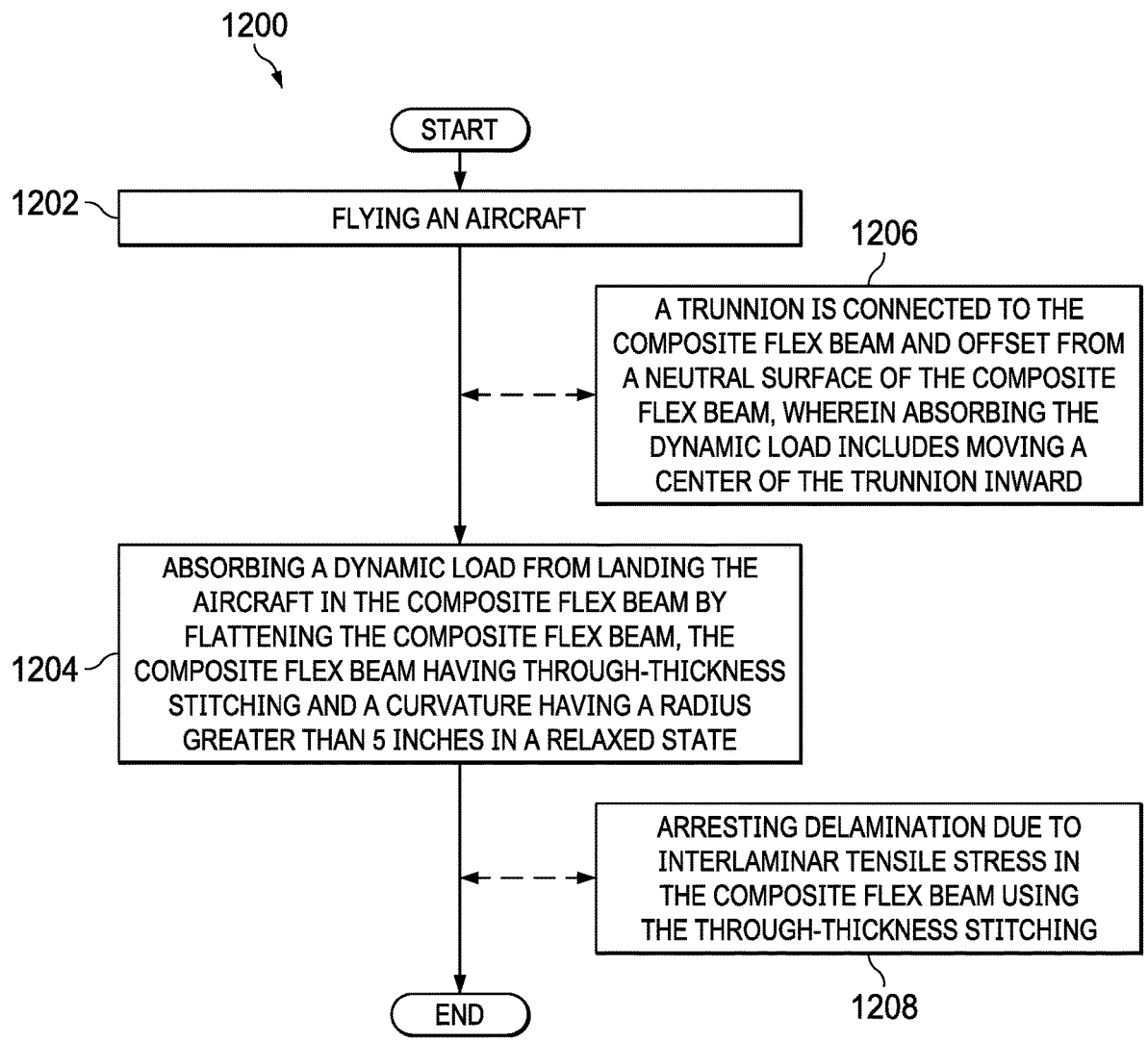
FIG. 12 is an illustration of a flowchart of a method of operating an aircraft with a landing gear system having a composite flex beam in accordance with an illustrative embodiment.

Turning now to FIG. 12, an illustration of a flowchart of a method of operating an aircraft with a landing gear system having a composite flex beam is depicted in accordance with an illustrative embodiment. Method 1200 may use landing gear system 102 of FIG. 1. Method 1200 may use composite flex beam 204 of FIGS. 2-4. Method 1200 may use composite flex beam 500 of FIGS. 5-6. Method 1200 may use composite flex beam 702 of FIG. 7. Method 1200 may use composite flex beam 802 of FIG. 8. Method 1200 may use composite flex beam 902 of FIG. 9.

Method 1200 flies the aircraft 104 (operation 1202). Method 1200 absorbs the dynamic load from landing the aircraft 104 in the composite flex beam 106 by flattening the composite flex beam 106, the composite flex beam 106 having through-thickness stitching 108 and a curvature 110 having a radius (112, 130) greater than 5 inches in a relaxed state (operation 1204). Composite flex beam 106 does not completely flatten when composite flex beam 106 absorbs the dynamic load. Composite flex beam 106 flattens an amount such that composite flex beam 106 deflects up to 12 inches in a Z-direction of composite flex beam 106. Composite flex beam 106 flattens an amount such that composite flex beam 106 undergoes an angular deflection of up to 15 degrees. Afterwards, method 1200 terminates.

In some illustrative examples, a trunnion 114 is connected to the composite flex beam 106 and offset 116 from a neutral surface 118 of the composite flex beam 106, and absorbing the dynamic load includes moving a center of the trunnion 114 inward (operation 1206). The through-thickness stitching 108 prevents out-of-tolerance inconsistencies due to interlaminar tensile stress in the composite flex beam 106. Method 1200 arrests delamination due to interlaminar tensile stress in the composite flex beam 106 using the through-thickness stitching 108 (operation 1208).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operations 1110 through 1114 of FIG. 11 may be optional. As another example, operations 1206 through 1208 of FIG. 12 may be optional.

Figure 13:
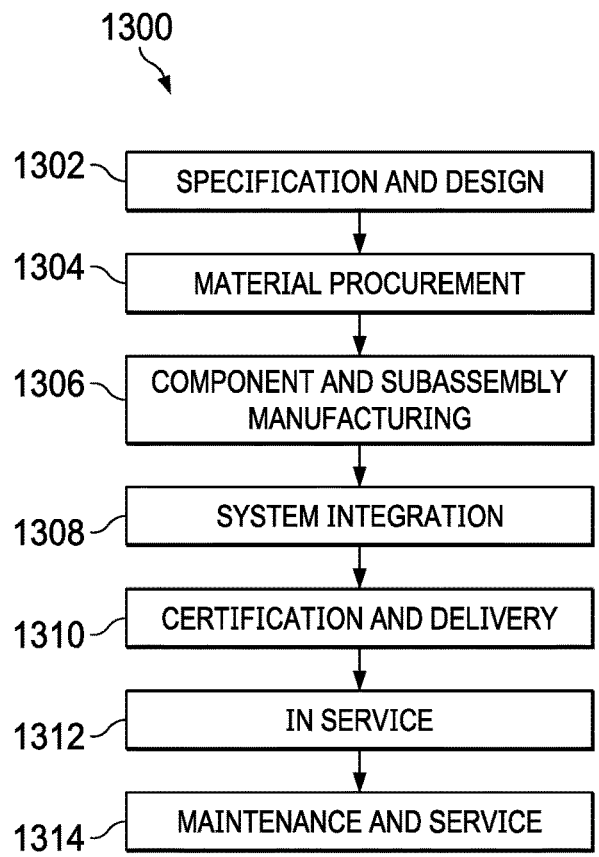
FIG. 13 is an illustration of an aircraft manufacturing and service method in a form of a block diagram in accordance with an illustrative embodiment.
Figure 14:
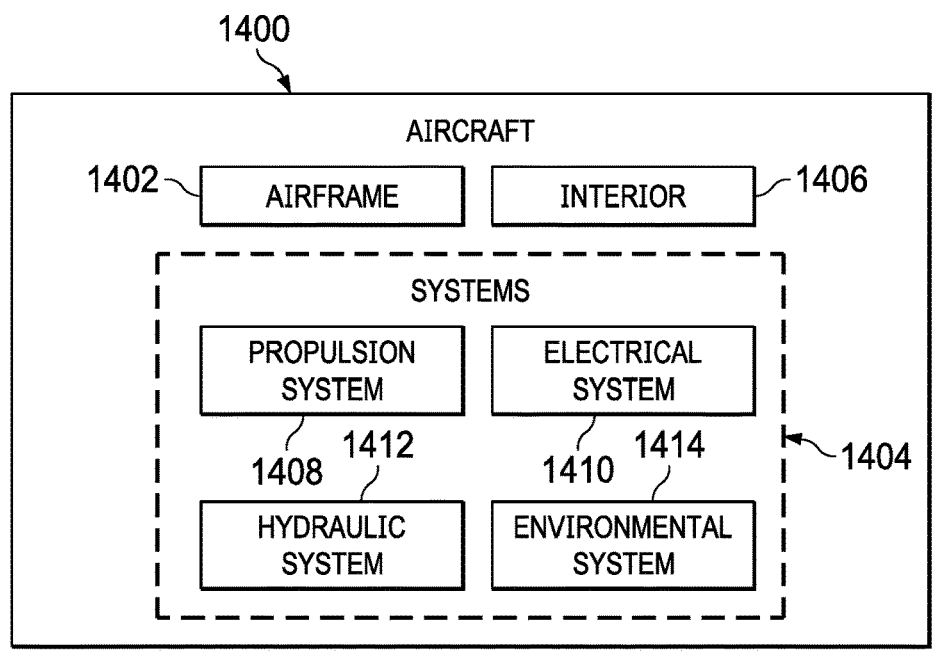
FIG. 14 is an illustration of an aircraft in a form of a block diagram in which an illustrative embodiment may be implemented.

Illustrative embodiments of the present disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During preproduction, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, or other maintenance and service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 of FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included.

Although an aerospace example is shown, different illustrative embodiments may be applied to other industries, such as the automotive industry.

Apparatuses and methods embodied herein may be employed during at least one of the stages of aircraft manufacturing and service method 1300. One or more illustrative embodiments may be used during at least one of component and subassembly manufacturing 1306, system integration 1308, or maintenance and service 1314 of FIG. 13. For example, the illustrative examples be used during component and subassembly manufacturing 1306 to form composite flex beam 106 of landing gear system 102. As an example, method 1100 may be used during component and subassembly manufacturing 1306 to form composite flex beam 106. Landing gear system 102 is part of airframe 1402 of aircraft 1400. Method 1100 may be used to manufacture portions of aircraft 1400 such as airframe 1402.

The illustrative examples present a landing gear system with a composite flex beam. The composite flex beam is formed of fiber layers that are stitched and resin infused.

The stitching improves out-of-plane strength and reduces interlaminar tension. The stitching reduces or arrests delamination in the composite flex beam. Resin infusion is the fabrication method employed to create a composite flex beam with out-of-plane stitching.

The illustrative examples provide a landing gear system configured to provide a desirable strength and deflection with a lower weight than a metal landing gear system. The illustrative examples provide a landing gear system configured to provide a desirable strength and deflection with a lower cost than an OLEO. The illustrative examples provide a composite flex beam configured to have a desirable strength to carry the load of an aircraft landing. The composite flex beam is configured to flex a prescribed amount without incurring inconsistencies. The deflection absorbs the load of landing an aircraft with the composite flex beam in the landing gear system. The through-thickness stitching in the composite flex beam provides out-of-plane strength. The offset of the trunnions in the landing gear system reduces stresses in the attached aircraft structures.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A landing gear system for an aircraft comprising:
   a composite flex beam having through-thickness stitching and a curvature having a radius greater than 5 inches, wherein the through-thickness stitching extends across an entirety of the composite flex beam along a length of the curvature, and wherein a density of the through-thickness stitching is greater near a leading edge and a trailing edge of the composite flex beam; and
   a trunnion connected to the composite flex beam and offset from a neutral surface of the composite flex beam.

2. The landing gear system of claim 1, wherein the composite flex beam is configured to have a maximum acceptable deflection value of between 12 inches and 14 inches in a Z-direction of the composite flex beam.

3. The landing gear system of claim 1, wherein the composite flex beam is configured to accommodate an angular deflection of up to 15 degrees.

4. The landing gear system of claim 1, wherein the through-thickness stitching is in a grid pattern having a cell size of between 0.2 inches and 0.5 inches.

5. The landing gear system of claim 1, wherein the trunnion is offset between 0.1 inches and 10 inches from a top surface of the composite flex beam, such that movement of the trunnion has an acceptable value, wherein a maximum acceptable value of trunnion movement is based upon the design of the aircraft having the trunnion.

6. The landing gear system of claim 5, wherein the maximum acceptable value of trunnion movement is such that induced strains on surrounding aircraft structures due to movement of the trunnion when a load is applied to the composite flex beam are acceptable based on the design of the aircraft.

7. The landing gear system of claim 1, wherein the curvature extends across an entirety of the composite flex beam.

8. A landing gear system for an aircraft comprising:
   a composite flex beam having through-thickness stitching and a curvature, the through-thickness stitching and the curvature along an entirety of a length of the composite flex beam, and a density of the through-thickness stitching being greater near a leading edge and a trailing edge of the composite flex beam.

9. The landing gear system of claim 8, wherein the composite flex beam is configured to have a maximum acceptable deflection value of between 12 inches and 14 inches in a Z-direction of the composite flex beam.

10. The landing gear system of claim 8, wherein the composite flex beam is configured to accommodate an angular deflection of up to 15 degrees.

11. The landing gear system of claim 8, wherein the through-thickness stitching is in a grid pattern.

12. The landing gear system of claim 11, wherein the grid pattern has a cell size of between 0.2 inches and 0.5 inches.

13. The landing gear system of claim 8, wherein the curvature is a varying curvature.

14. The landing gear system of claim 8 further comprising:
    a trunnion positioned at least 0.1 inches above a top surface of the composite flex beam.

15. The landing gear system of claim 1, wherein the through-thickness stitching has more than one thread diameter.

16. A method of forming a landing gear system for an aircraft, the method comprising:
    laying up fiber layers into a curvature having a radius greater than 5 inches, each fiber layer having a respective fiber orientation;
    stitching through the fiber layers along a length of the curvature with through-thickness stitching to form a reinforced plurality of layers, a density of the through-thickness stitching being greater near a leading edge and a trailing edge of the curvature;
    infusing a resin into the reinforced plurality of layers to form a resin infused curved structure;
    curing the resin infused curved structure to form a composite flex beam of the landing gear system, wherein the through-thickness stitching extends across an entirety of the composite flex beam along the length of the curvature; and attaching the composite flex beam to the aircraft using a trunnion offset from a neutral surface of the composite flex beam.

17. The method of claim 16, wherein the trunnion is located at least 0.1 inches above the composite flex beam, such that movement of the trunnion due to flexing of the composite flex beam is minimized.

18. The method of claim 16, wherein stitching comprises:
stitching through the fiber layers in a grid pattern, the grid pattern has a cell size of between 0.2 inches and 0.5 inches.

19. The method of claim 16, wherein laying up the fiber layers comprises laying up at least one layer having a non-traditional fiber orientation.

20. A landing gear system for an aircraft comprising:
a composite flex beam having through-thickness stitching and a curvature having a radius greater than 5 inches, wherein the through-thickness stitching extends across an entirety of the composite flex beam along a length of the curvature, and wherein the through-thickness stitching has more than one thread diameter; and
a trunnion connected to the composite flex beam and offset from a neutral surface of the composite flex beam.

* * * * *